June 5, 1956 J. J. CHIKA 2,749,143
PASSENGER SAFETY DEVICE FOR VEHICLES
Filed Aug. 8, 1951 10 Sheets-Sheet 1
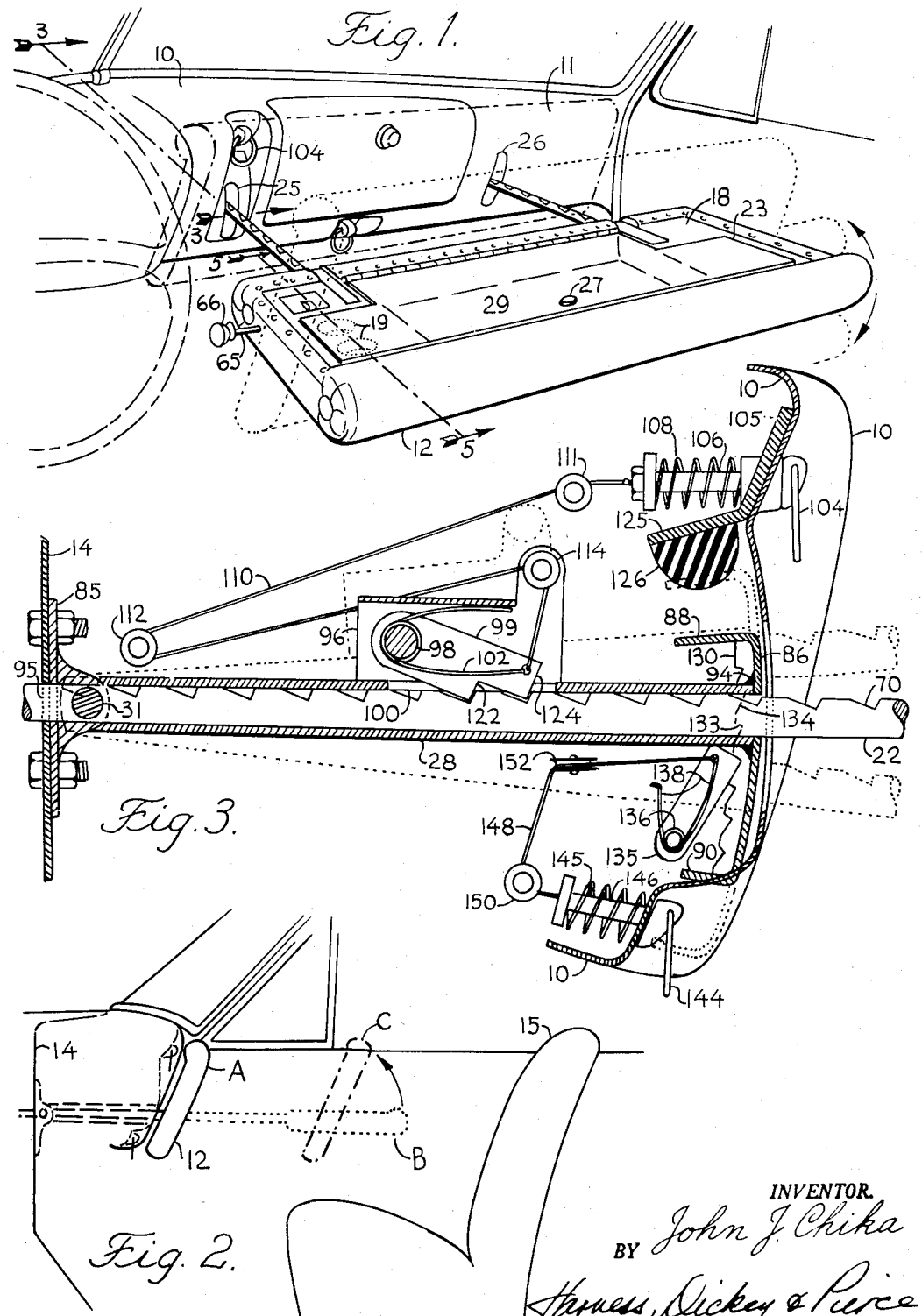
INVENTOR.
BY John J. Chika
Harness, Dickey & Pierce
ATTORNEYS June 5, 1956  J. J. CHIKA  2,749,143
PASSENGER SAFETY DEVICE FOR VEHICLES
Filed Aug. 8, 1951  10 Sheets-Sheet 2
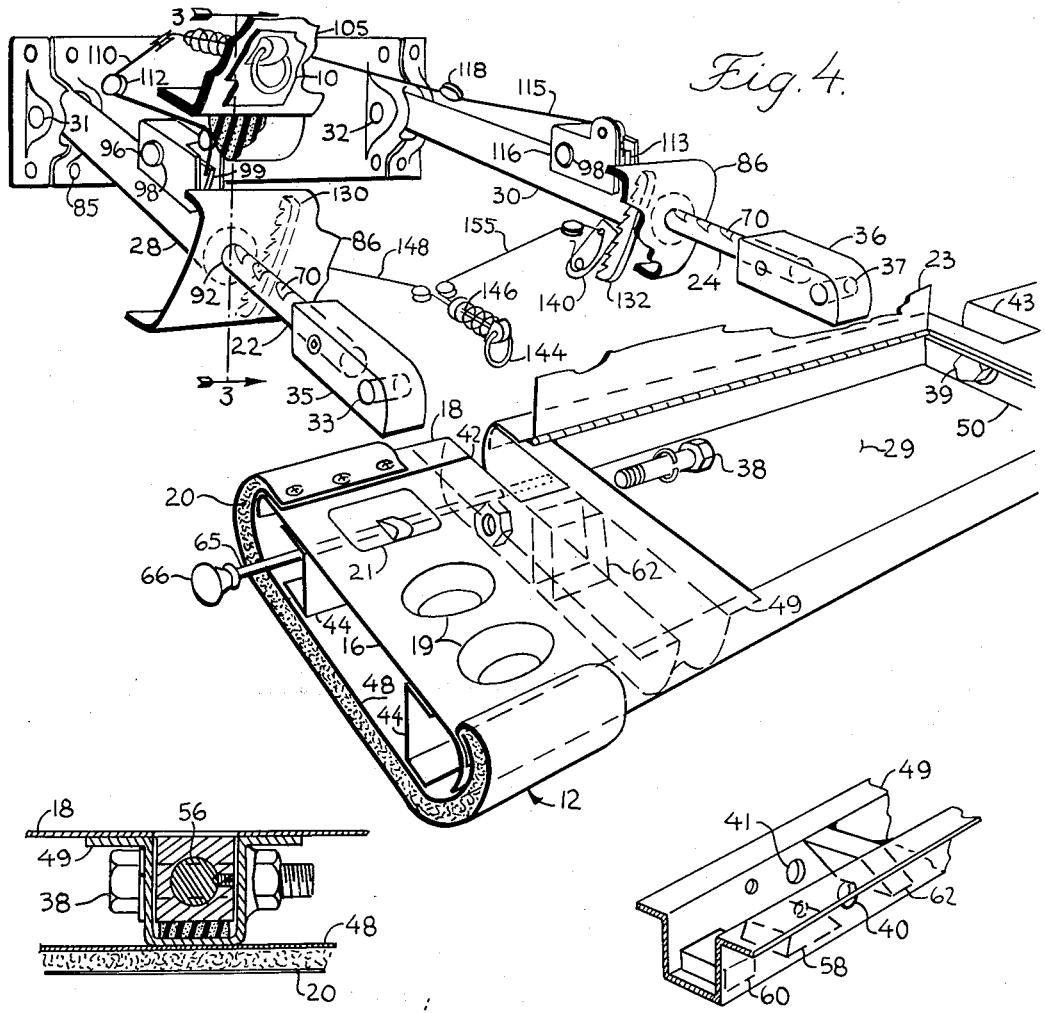
Fig. 4.
Fig. 6.
Fig. 7.
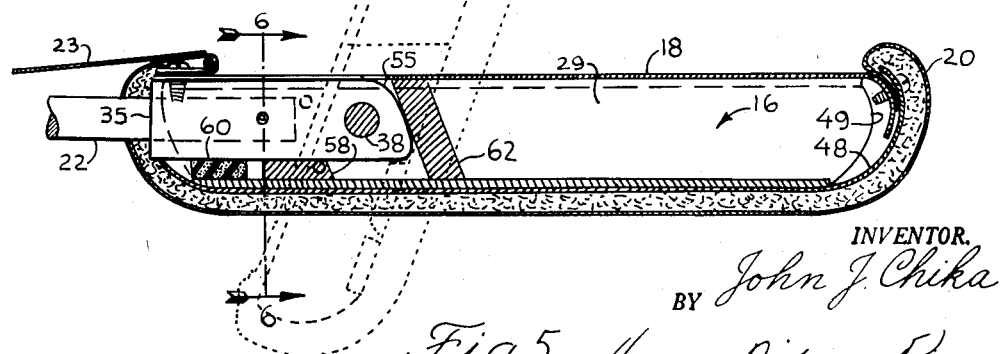
Fig. 5.
INVENTOR.
BY John J. Chika
Harness, Dickey & Pierce
ATTORNEYS June 5, 1956 J. J. CHIKA 2,749,143
PASSENGER SAFETY DEVICE FOR VEHICLES
Filed Aug. 8, 1951 10 Sheets-Sheet 3
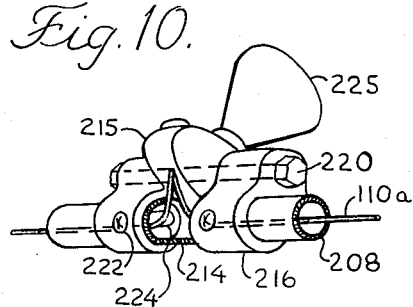
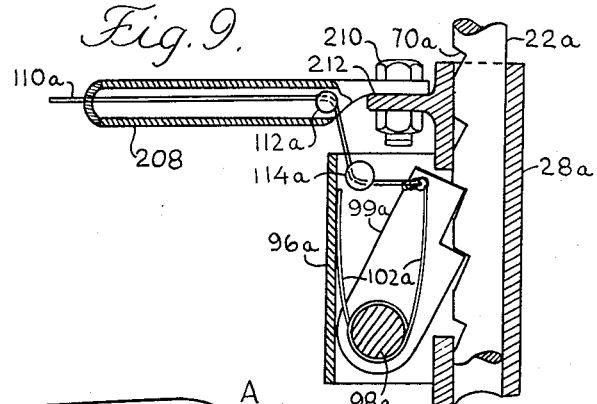
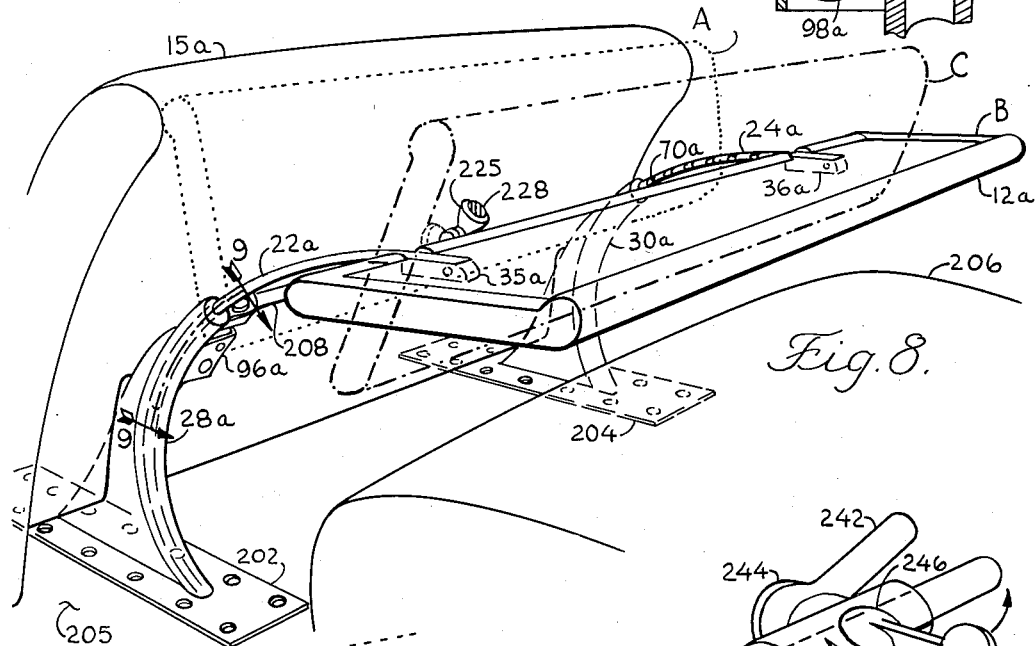
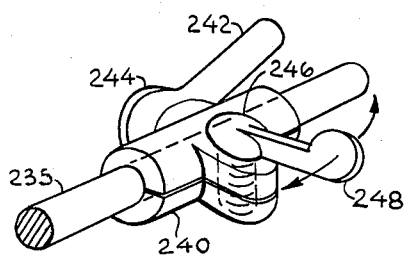
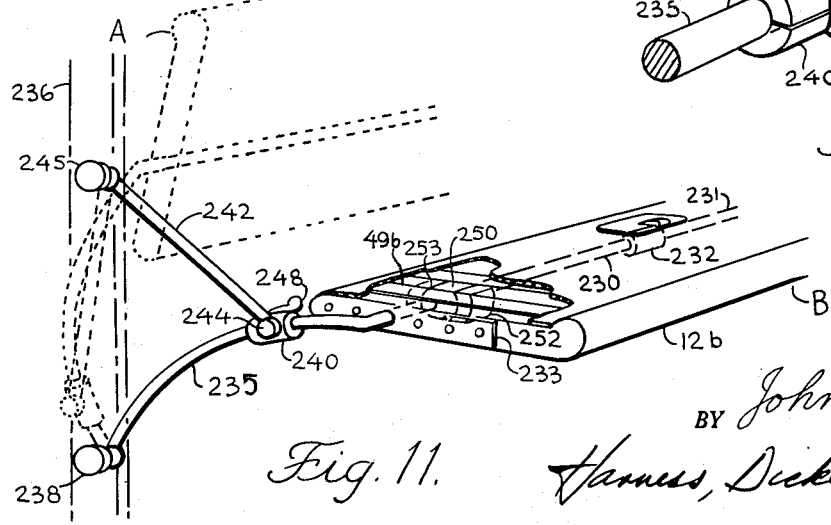
INVENTOR.
John J. Chika
BY Harness, Dickey & Pierce
ATTORNEYS.

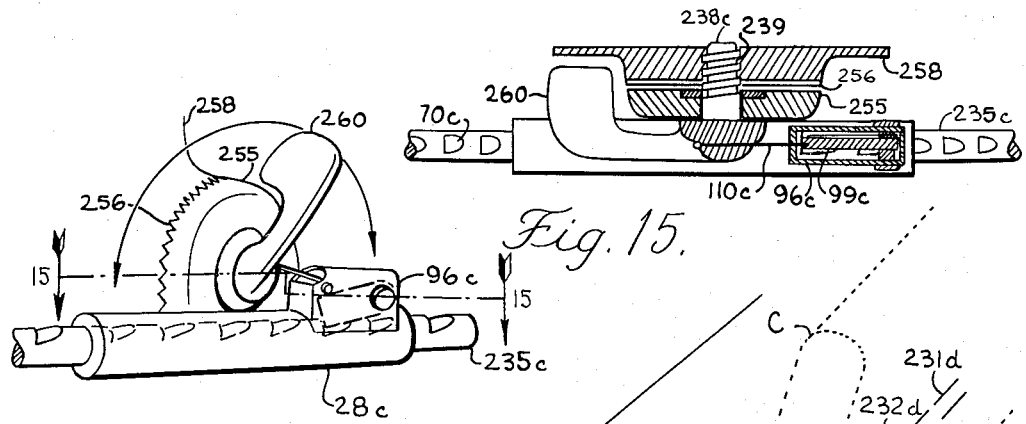
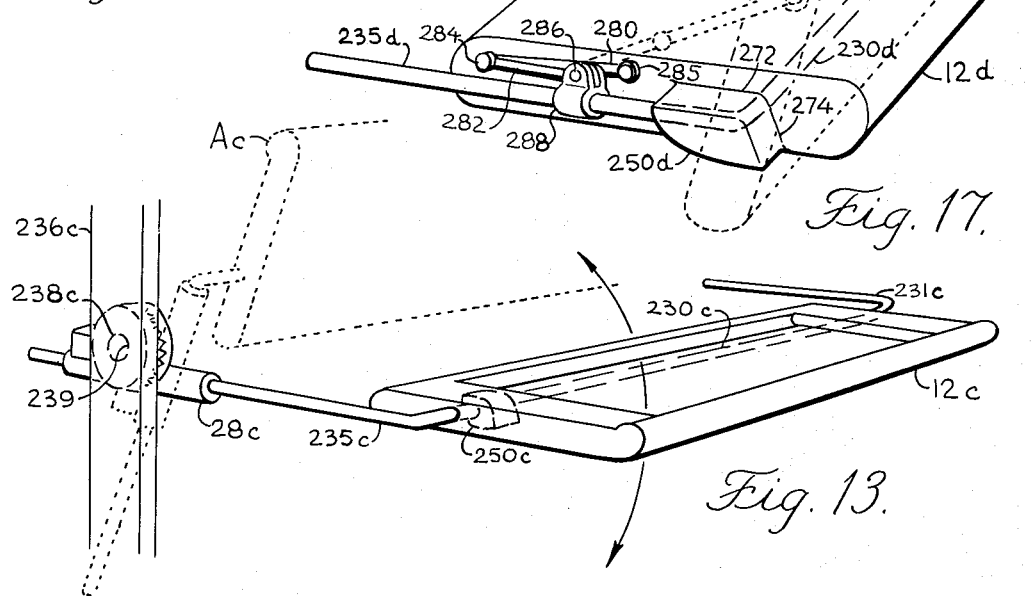
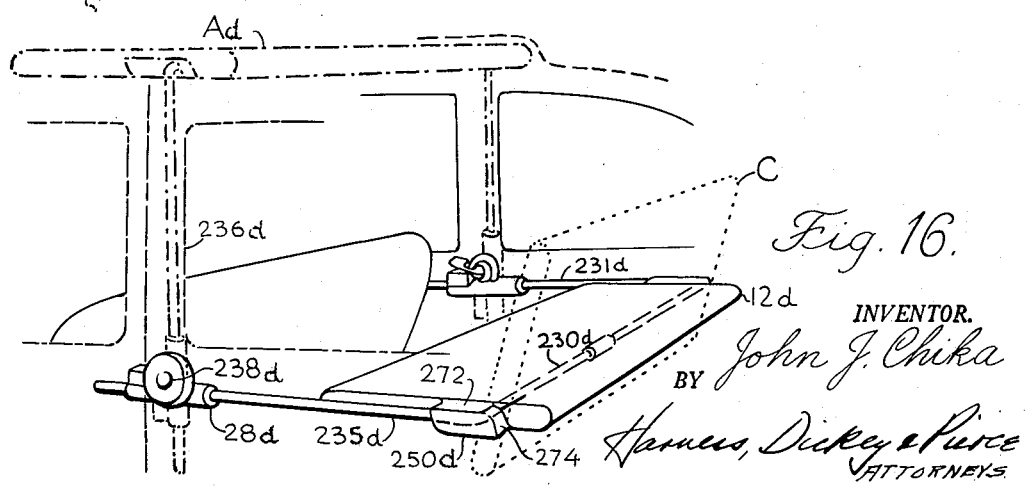

June 5, 1956  J. J. CHIKA  2,749,143
PASSENGER SAFETY DEVICE FOR VEHICLES
Filed Aug. 8, 1951  10 Sheets-Sheet 5
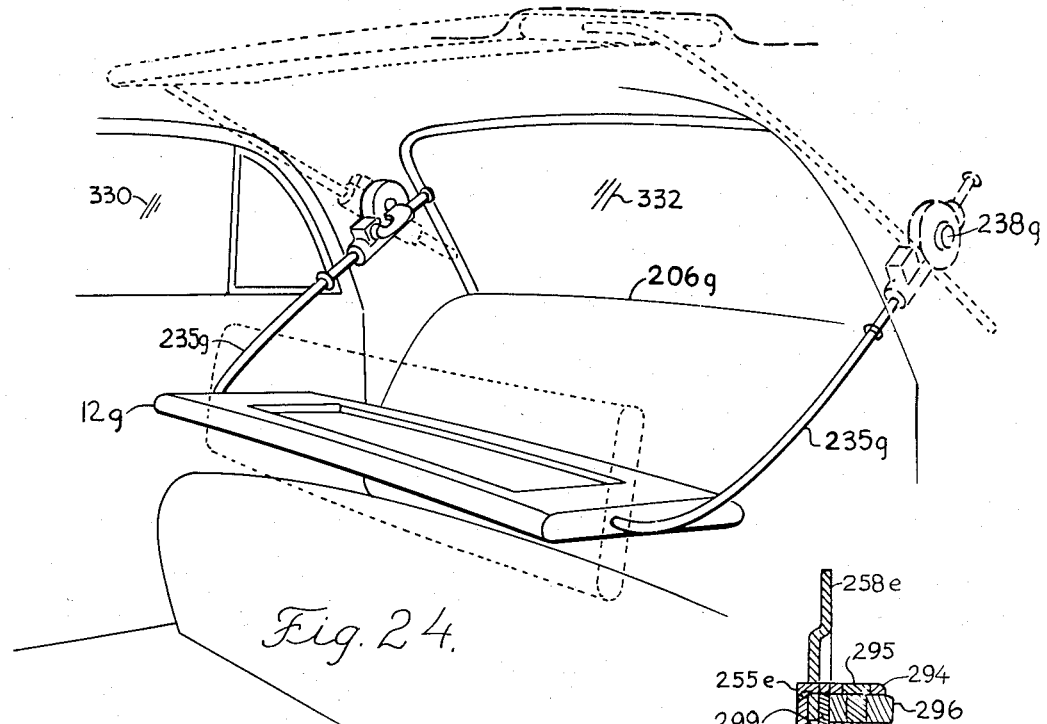
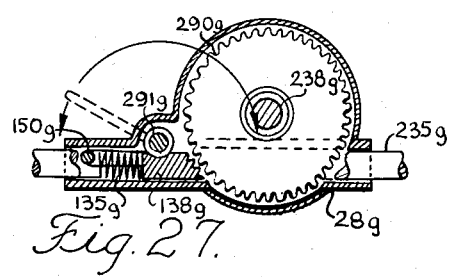
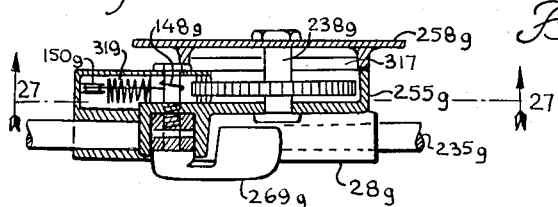
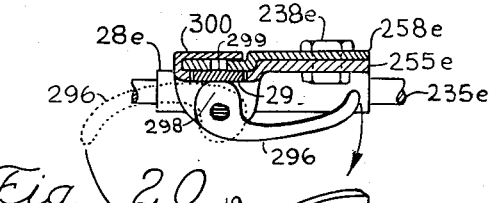
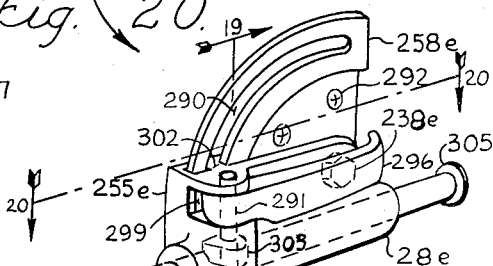
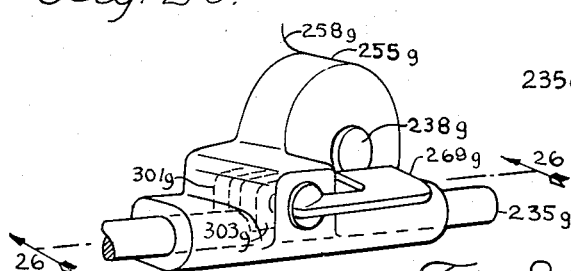
INVENTOR.
John J. Chika
BY Harness, Dickey & Pierce
ATTORNEYS.

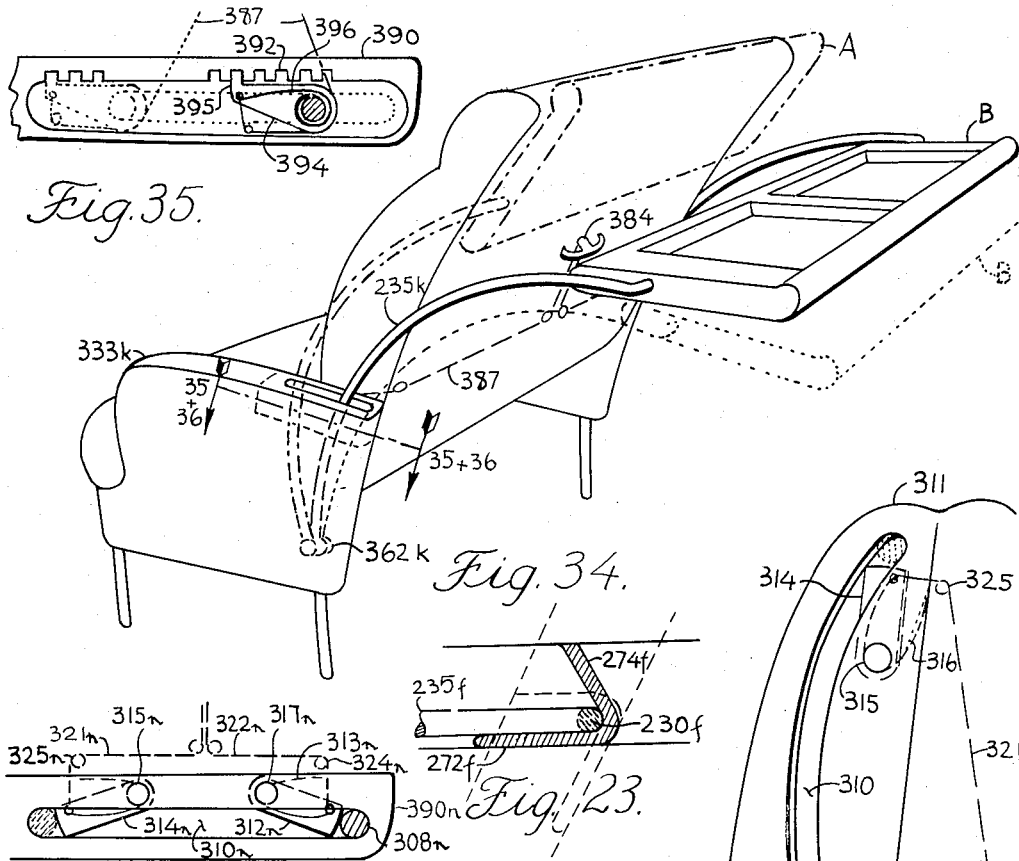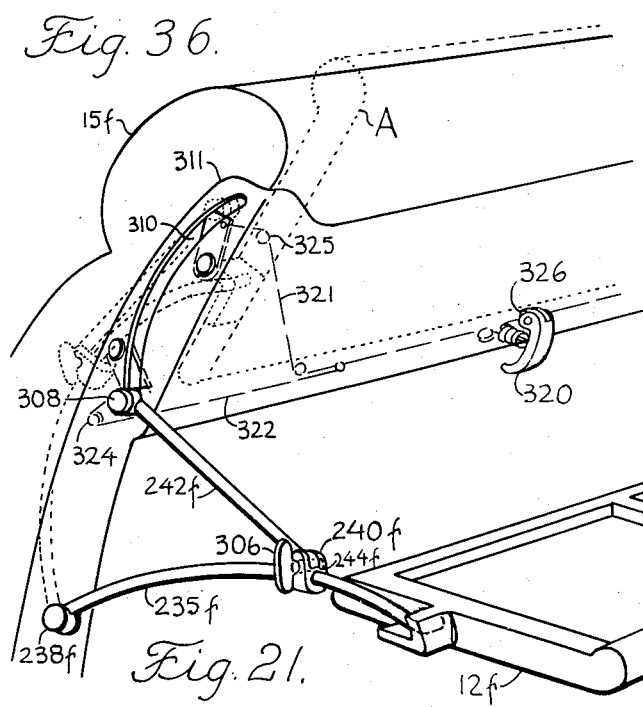

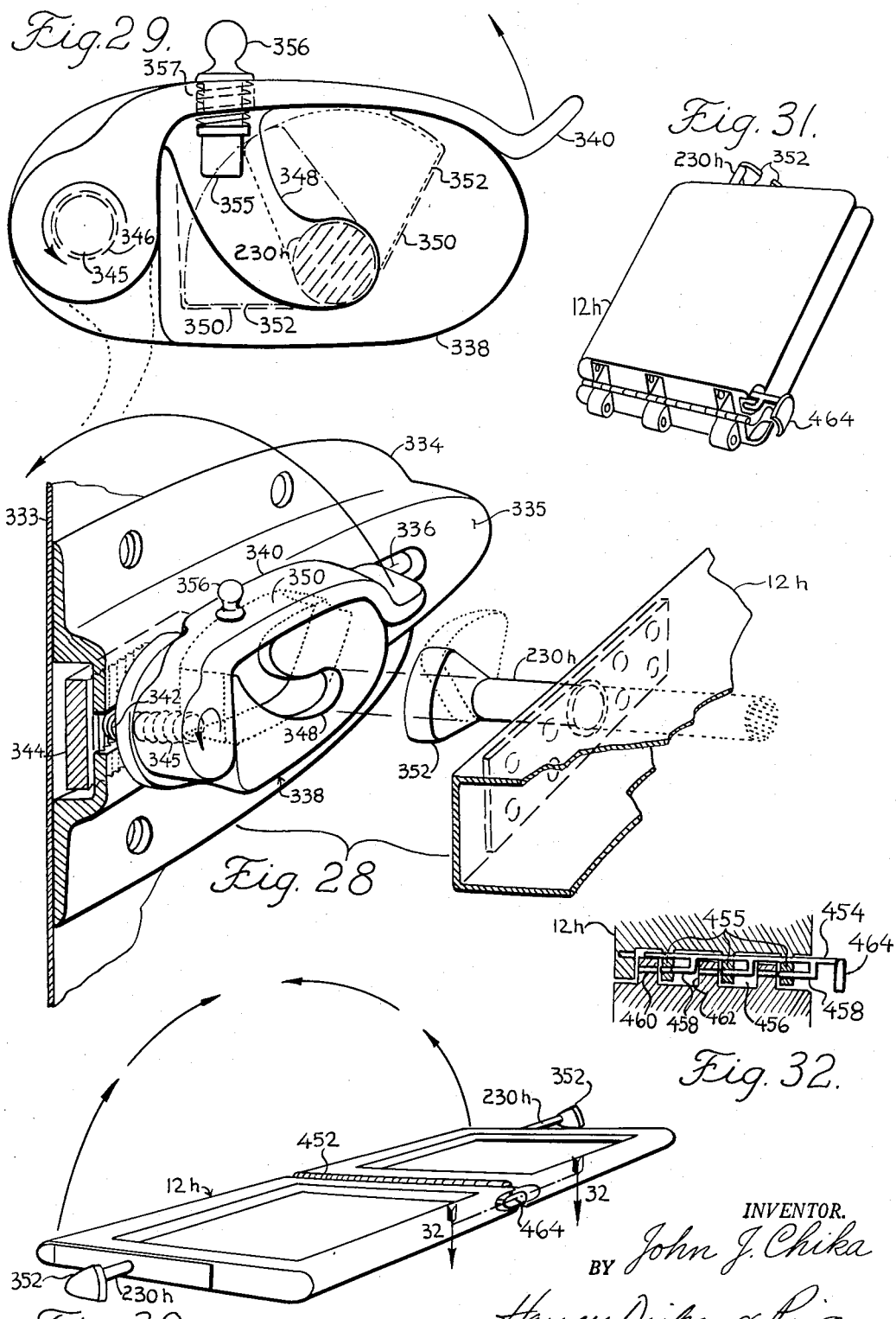

June 5, 1956  J. J. CHIKA  2,749,143
PASSENGER SAFETY DEVICE FOR VEHICLES
Filed Aug. 8, 1951  10 Sheets-Sheet 8
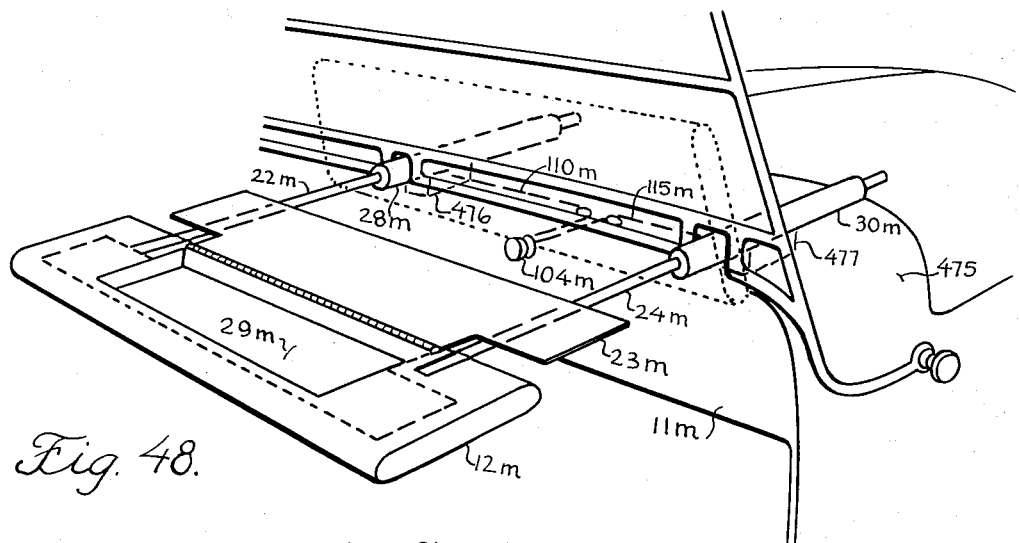
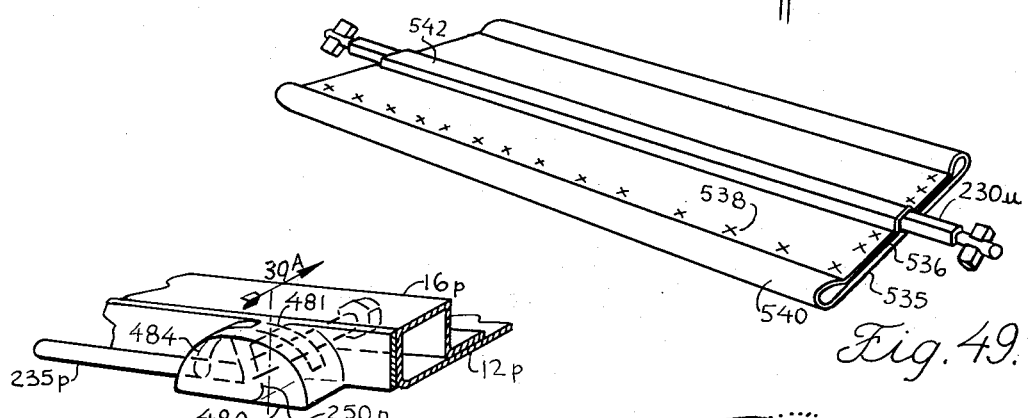
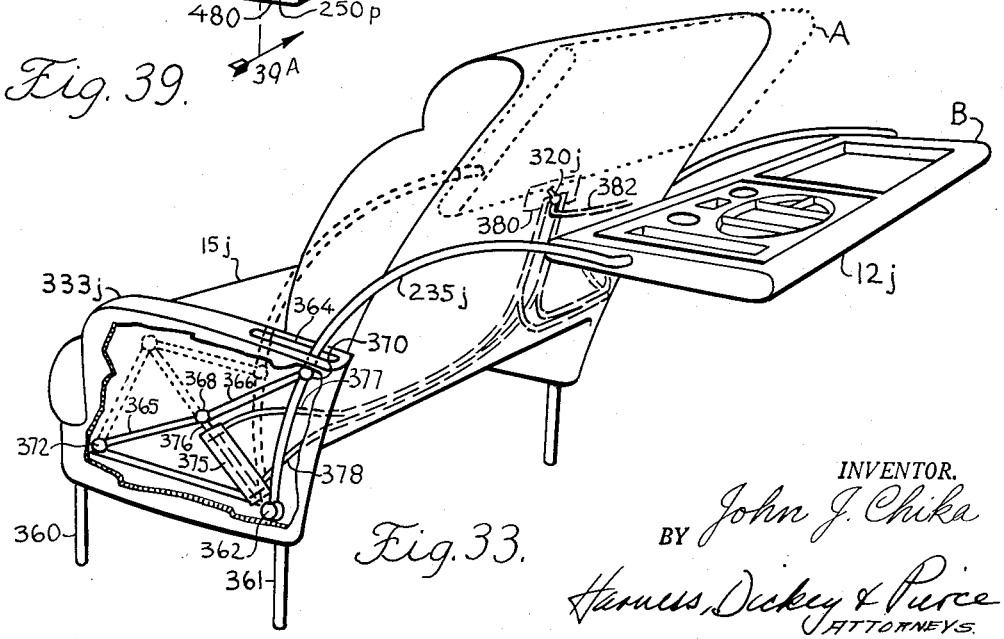
INVENTOR.
John J. Chika
BY Harness, Dickey & Pierce
ATTORNEYS.

June 5, 1956 J. J. CHIKA 2,749,143
PASSENGER SAFETY DEVICE FOR VEHICLES
Filed Aug. 8, 1951 10 Sheets-Sheet 9

INVENTOR.
John J. Chika
BY
Harness, Dickey & Pierce
ATTORNEYS.

June 5, 1956  J. J. CHIKA  2,749,143
PASSENGER SAFETY DEVICE FOR VEHICLES
Filed Aug. 8, 1951  10 Sheets-Sheet 10
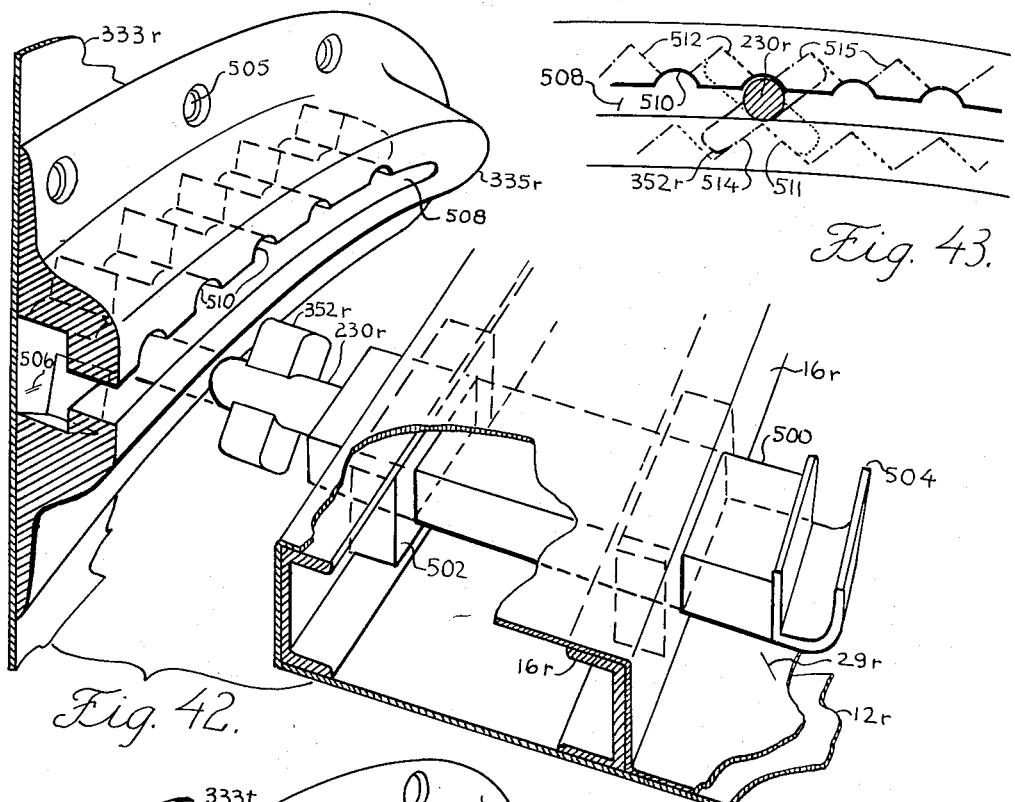
Fig. 42.
Fig. 43.
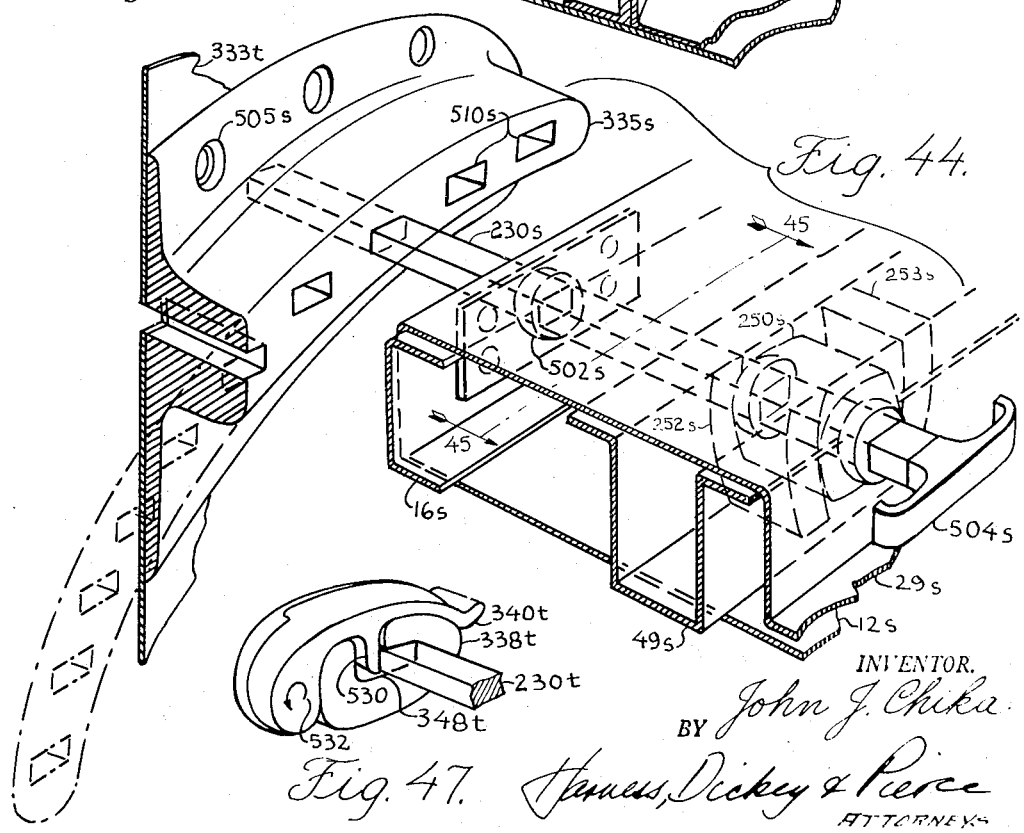
Fig. 44.
Fig. 47.
INVENTOR.
John J. Chika
BY Hanness, Dickey & Pierce
ATTORNEYS United States Patent Office 2,749,143
Patented June 5, 1956

2,749,143

PASSENGER SAFETY DEVICE FOR VEHICLES

John J. Chika, Bloomfield Hills, Mich.

Application August 8, 1951, Serial No. 240,883

27 Claims. (Cl. 280—150)

The present invention relates to safety devices for installation in vehicles to reduce the risk of bodily injury to the occupants, and particularly to a novel retractable, tilting type body restraining device.

One of the great dangers to the passengers of vehicles derives from the fact that a collision frequently throws the passengers forwardly, causing serious injuries to the head and upper body portions or causing fractures of limbs of the passengers by throwing them against the dashboard, into the windshield, or adjacent portions of the body structure, or, in case of rear seat occupants, against the back of the front seat. Some vehicles have been equipped with small crash pads located along the upper portion of the instrument panel, but the protection afforded by such crash pads is very limited. The more severe the accident, the greater the likelihood that the passenger will be thrown upwardly high enough so that the passenger's head will completely miss such a small crash pad. The magnitude of the upward component is such that passengers are frequently thrown into or through the windshield, and are also often thrown high enough so that the passenger's head strikes the roof or the frame structure above the windshield. Children and invalids suffer even when a sudden stop is necessary to avoid greater accident because they cannot brace themselves sufficiently. Also, the occupants of the rear seat are frequently thrown into the front seat compartment, adding to the injuries of those in front and sometimes tearing the front seat off the floor and compressing their combined weights and momentum against the front occupants. In vehicles having less confined passenger space (such as busses and trains) the occupants tend to bounce around, suffering injuries at every contact, because there is nothing to restrain their motion due to inertia.

With the foregoing considerations in mind, the present invention aims to provide improved means for effectively protecting passengers against such hazards as have been outlined above, by furnishing effective insurance against throwing passengers into contact with parts of the vehicle which might cause serious injury, and to prevent "piling" into forward sections of the vehicle. An object related to that above stated is to provide an improved safety mechanism which, while effective to hold the passenger against being thrown forwardly, does not require the use of safety belts or other devices of a cumbersome, uncomfortable or inconvenient nature or which must be attached to the body. In fact, in the practice of my invention, nothing whatever need be attached to the passenger's body, and the comfort and freedom of movement of the passenger is not restricted.

Another paramount advantage of my invention is that it is not dependent on any human reflexes or dexterity to be fully operative and afford protection. Once the occupant is seated in the vehicle, all he has to do is to position the device to suit his personal comfort. From then on, he can forget it; it will do the rest automatically; and the more sudden or severe the jolt, the faster my device will react and protect him. The passenger can enjoy the scenery, read, play games or sleep, he may "freeze" with fear at the sight of an impending accident, he may be a helpless invalid, an infant, or even intoxicated. Regardless of such conditions, the device operates at full efficiency with no thought, effort or action on the part of the passenger.

Still another object is to provide such a safety device which is usable either in such manner as is above indicated to furnish much greater protection than would be afforded by a simple crash pad, or alternatively may be used as a crash pad, in a position pushed back against the instrument panel or equivalent body portion in front of the passenger, where it affords greater protection than crash pads of the character currently in use, and where it presents an especially neat and attractive appearance and is completely out of the way.

Another object is to provide such a safety device which is also usable in a position close to the passenger's body, where it serves as a cushioned brace to effectively hold the passenger from being thrown forwardly into contact with other parts of the vehicle which might cause lesions. A related object is to provide such a device usable in either of two operative positions as indicated and which is quickly and easily movable between such positions as desired.

Still another object is to provide such a safety device which, when ocupying its position of maximum effectiveness wherein it lies relatively close to the passenger's body, it serves at the same time as a convenient horizontal table which the passenger may use as a desk, tray or support for maps, glasses, refreshments or the like, as well as a rest for his arms and/or head, and against which he may lean or rest by lying forwardly and resting his head and arms as one might upon a table.

Still another object is to provide such a device which is vertically adjustable to suit the comfort and convenience of passengers of different sizes and to provide for their maximum protection.

The foregoing and other objects which will become apparent upon consideration of the present disclosure in its entirety are achieved by novel mechanism of such character that although the body bracing element occupies a horizontal position and may serve as a tray or table under normal conditions, in event of an accident which tends to throw the passenger forwardly, the momentum of the vehicle will automatically, without any reliance on any human reflexes or operation of any mechanism, cause such element to swing to a more or less vertical position, wherein it effectively blocks the passenger's body against forward movement in relation to the vehicle and presents a relatively large cushioning surface against which the passenger's chest is braced and against which the momentum of his body resulting from the collision or sudden stop is expended.

In the drawings:

Figure 1 is a perspective view of the front interior portion of a closed motor vehicle body showing the passenger's side, and showing a safety device constructed in accordance with the principles of the present invention, the device being illustrated in the normal extended or lounging position in which it provides a table-like surface for the comfort of the passenger and is set to provide maximum protection of the passenger in case of accident;

Fig. 2 is a diagrammatic side elevational view showing the safety device in the several positions which it occupies in use;

Fig. 3 is a sectional elevational view taken substantially as indicated by the line and arrows designated 3—3 in Fig. 1;

Fig. 4 is a diagrammatic view, partially exploded and partly broken away, of the principal operative components;

Fig. 5 is a cross-sectional view of the safety table and its pivotal supporting means, taken substantially on the line 5—5 of Fig. 1 and looking in the direction of the arrows;

Fig. 6 is a sectional detail taken substantially on the line 6—6 of Fig. 5 and looking in the direction of the arrows;

Fig. 7 is a fragmentary detail perspective view of a part of the safety table pivot and frame structure;

Fig. 8 is a fragmentary, perspective view of the rear compartment of a sedan body of the four door type equipped with a somewhat modified embodiment of my invention;

Fig. 9 is a sectional detail taken substantially on the line 9—9 of Figure 8 and looking in the direction of the arrows;

Fig. 10 is a sectional perspective view of a part of the release mechanism for the embodiment of Figure 8;

Fig. 11 is a fragmentary perspective view of another modified construction;

Fig. 12 is a detailed perspective view of a releasable clamping mechanism employed in the embodiment of Figure 11;

Fig. 13 is a perspective view similar to Figure 11 showing another modified construction;

Fig. 14 is a perspective detail of an adjustable supporting and locking mechanism employed in the embodiment of Figure 13;

Fig. 15 is a sectional detail taken substantially on the line 15—15 of Fig. 14 and looking in the direction of the arrows;

Fig. 16 is a perspective view of the rear portion of a motor car incorporating the invention in another modified form;

Fig. 17 is a perspective view upon a somewhat larger scale showing a portion of the safety table and the supporting and pivoting mechanism therefor, as employed in the embodiment of Fig. 16;

Fig. 18 is a perspective view of a somewhat modified adjustable supporting and locking mechanism;

Figure 45:
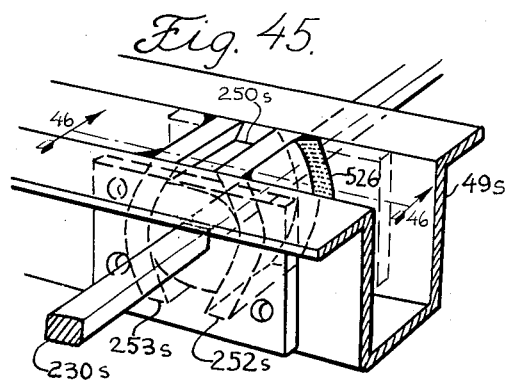
Figure 46:
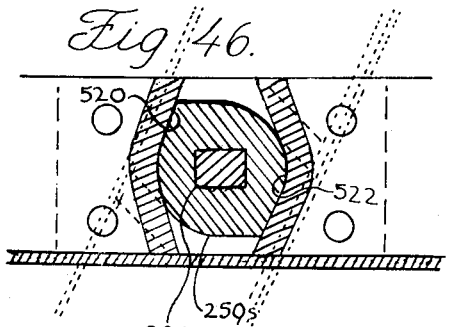
Figure 41:
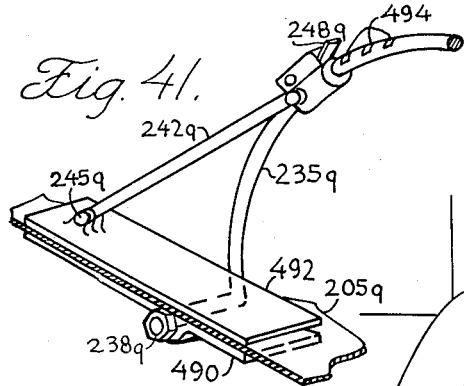
Figure 39A:
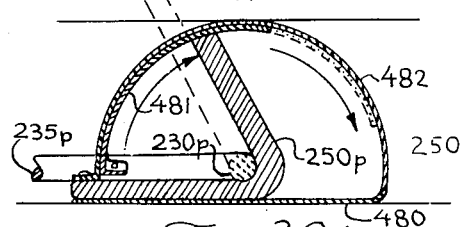
Figure 40:
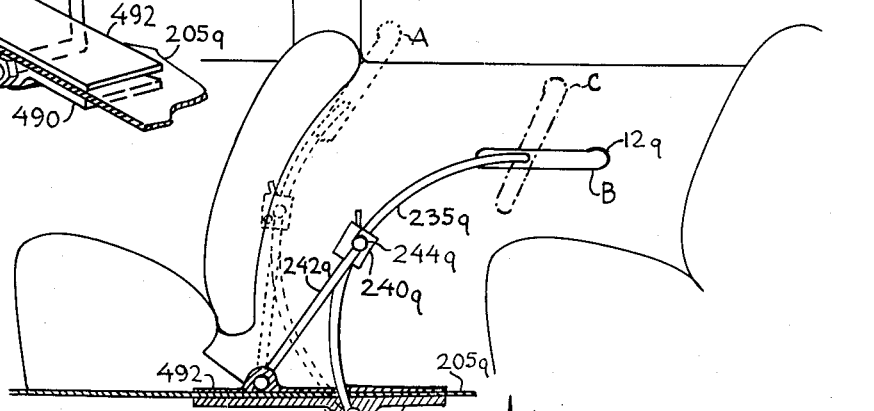
Figure 37:
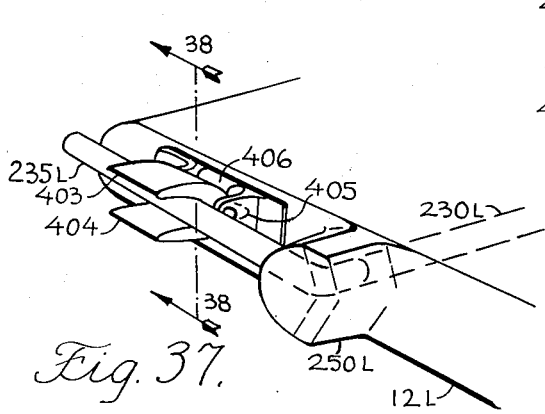
Figure 38:
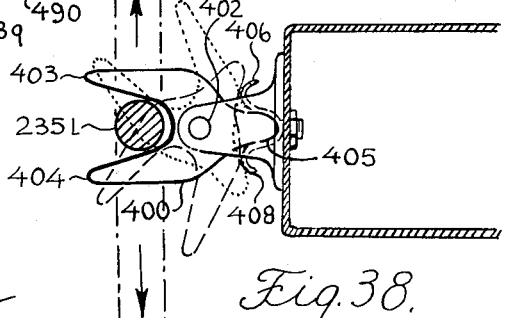

Figs. 19 and 20 are cross-sectional views taken substantially on the lines 19—19 and 20—20 respectively of Figure 18 and looking in the direction of the arrows;

Fig. 21 is a perspective view similar to Figure 11, showing the invention in a further modified form;

Fig. 22 is a perspective view, partly in phantom, of the upper portion of the end of the seat structure shown in Figure 21, with the supporting arms broken away and illustrating the action of the locking mechanism;

Fig. 23 is a fragmentary perspective view of the end portions of the safety table and supporting means of the embodiment of Figure 21, illustrating the tilt-limiting means;

Fig. 24 is a perspective view of the rear interior portion of a motor vehicle incorporating my invention in another modified form;

Fig. 25 is a perspective detail upon a larger scale, showing the adjustable supporting and locking means employed in the embodiment of Figure 24;

Fig. 26 is a horizontal sectional detail taken substantially on the line 26—26 of Figure 25 and looking in the direction of the arrows;

Fig. 27 is a vertical sectional detail taken substantially on the line 27—27 of Figure 26 and looking in the direction of the arrows;

Fig. 28 is a perspective view of the principal supporting portions of a safety device incorporating my invention in another modified form;

Fig. 29 is a somewhat diagrammatic elevational view of the mechanism of Figure 28;

Fig. 30 is a perspective view of the safety table employed in the embodiment of Fig. 28 showing the same in open position;

Fig. 31 is a similar perspective view showing the table folded;

Fig. 32 is a sectional detail of the same showing locking mechanism for holding the table rigidly in the flat, unfolded condition;

Fig. 33 is a perspective view of a vehicle seat structure equipped with a protective device constructed in accordance with another modified form of my invention and adapted to protect the occupants of a seat located to the rear of the seat illustrated therein;

Fig. 34 is a perspective view similar to Figure 33, showing another modification;

Fig. 35 is a horizontal, sectional plan view taken substantially on the line 35—35 of Figure 34 and looking in the direction of the arrows;

Fig. 36 is a view similar to Fig. 35 showing modified latching mechanism;

Fig. 37 is a fragmentary perspective view of the end portion of a safety table and pivot structure incorporating my invention in a further modified form;

Fig. 38 is a vertical sectional detail taken substantially on the line 38—38 of Figure 37 and looking in the direction of the arrows, and Fig. 39 is a fragmentary perspective view of the end portion of a safety table structure of another somewhat modified construction;

Fig. 39A is a vertical, sectional view taken substantially on the line 39A—39A of Fig. 39 and looking in the direction of the arrows;

Fig. 40 is a somewhat diagrammatic view partly in vertical section and partly in side elevation showing my invention in another somewhat modified form as applied to a sedan-type automobile;

Fig. 41 is a fragmentary perspective detail of a part of the supporting mechanism of the embodiment of Fig. 40;

Fig. 42 is a perspective view partly broken away of the principal supporting portions of a safety device incorporating my invention in another modified form;

Fig. 43 is a somewhat diagrammatic fragmentary sectional elevation of the supporting portions of the embodiment of Fig. 42;

Fig. 44 is a view similar to Fig. 42 showing another modification;

Fig. 45 is a detailed perspective view of a part of the safety table frame structure and the means for limiting rotation of the safety table;

Fig. 46 is a vertical, sectional view of the means for limiting rotation of the safety table;

Fig. 47 is a perspective view of the supporting portions of a device of another modified form;

Fig. 48 is a perspective view of the front portion of a motor vehicle incorporating my invention in another modified form; and Fig. 49 is a perspective view of a safety table structure of another modified construction.

Referring now to the drawings, reference character 10 designates generally the instrument panel of a closed motor vehicle body. The body and instrument panel may be substantially conventional in construction but the instrument panel, as shown in Fig. 1, is preferably provided with a substantially flat and vertical recess 11 conforming to the size and thickness of the protective assembly 12 of my improved safety device. Forwardly of the instrument panel, between the passenger compartment and the engine compartment, the vehicle body may be provided with a fire wall as 14, which will be recognized as conventional practice in the construction of automobile bodies. The front seat is shown at 15. I will herein refer to the protective assembly 12 of my improved safety device as a "safety table," this being a convenient name which suggests its dual function. The frame structure of the safety table may be formed of sheet metal as best shown in Figs. 4, 5, 6 and 7, wherein the frame structure is generally designated 16. The top face of the frame structure 16 may be exposed at the surface of the safety table assembly, while the bottom face of the assembly, and the front and rear edges, are preferably covered with shock absorbing material as indicated at 20. When in use under ordinary driving or "lounging" conditions, as shown in Fig. 1, the safety table occupies a more or less horizontal position. The exposed top face 18 of the framework structure 16 may be essentially flat and adapted to serve as a table-like surface. As also best shown in Figs. 1, 4 and 5, the interior of the safety table may be formed as a hollow enclosure 29 serving as a storage receptacle and normally covered by a flat lid 23 held by a releasable catch 27 and constituting the major portion of the flat table-like surface. Openings or depressions as 19, and an ash tray as 21, may be provided in the exposed face of the safety table frame to assist in holding glasses and the like and for the convenience of the passenger. It will be appreciated that I have here shown just one of the many possible arrangements of such various conveniences or accessory features of the safety table, and I believe it will suffice to mention that they could be rearranged, omitted or added to as the applied use of my invention might make preferable. They could contain various controls and/or articles desired to be installed, such as a food tray or pillow holders for airplanes, trains, busses, etc. The safety table assembly extends transversely of the vehicle, parallel to the seat 15 and preferably for the full width of the passenger's portion of the seat.

Near its opposite ends the safety table assembly 12 is connected, by pivot means presently to be described, to a pair of relatively heavy supporting bars 22, 24 which extend fore and aft of the vehicle. These can be either in the shape of a round steel rod as I show them or of any other cross-section such as solid, square, rectangular, oval, V-shaped, T-shaped, U-shaped or tubular, or any other shape affording the necessary strength. The slide bearing supports 28—30 would, of course, have to match such selected cross-section. When the safety table is to be moved from the retracted, recessed or "crash-pad" positioning shown in full lines at "A" in Fig. 2 to the fully effective projected position shown in dotted lines at "B" in Fig. 2 (and also shown in Fig. 1), wherein it lies close to the passenger, the bars 22, 24 slide rearwardly to permit such movement. In the embodiment shown in Figs. 1–7 the bars 22, 24 extend freely through openings 25, 26 respectively in the instrument panel and are slidably supported in tubular slide bearing supports 28, 30. The tubular supports 28, 30 are carried by the fire wall 14 or other suitable supporting structural portion of the vehicle to which they are atached by coaxial pivot pins 31, 32 for pivotal adjustment in a manner presently to be described. The tubular members 28, 30 also support ratchet mechanisms presently to be described, which prevent the bars 22 and 24, and so the safety table 12 from moving forwardly from the projected position to the recessed position except when the ratchet mechanism is released.

Rigidly secured to the rearwardly projecting extremity of each of the bars 22, 24 are bracket blocks 35, 36. Each bracket block is apertured at 33, 37, to receive pivot bolts 38, 39. Pivot bolts 38, 39 are coaxial and the construction of the pivoted parts of the frame structure 16 which coact with each of the two pivot bolts being alike, I have illustrated in detail only the pivoted parts at the left end of the safety table. Bolt 38 projects into holes designated 40, 41 in the framework structure of the safety table 12, to pivotally support the safety table by coacting with similar parts carried by the bolt 39.

The frame structure is provided with a pair of slotlike openings 42 and 43 in its top web 18, which openings are adapted to fit over the blocks 35, 36 and are proportioned to permit the frame structure and safety table to swing freely upwardly from the horizontal position shown in Fig. 1 about the coaxial pivot bolts 38, 39. The frame structure of the safety table also includes a second or bottom panel 48 disposed spacedly below and substantially parallel to the top panel 18 and positioned with respect to the top panel by vertical spacers as 44 and by a pair of channeled frame elements 49, 50, arranged at spaced intervals along the length of the frame structure. It will be understood that the safety table structure might be formed in one piece or otherwise altered quite radically in construction. Basically, all that is required is a surface plane of desired size and two anchors for pivot means such as the bolts 38 and 39. The spacing between frame elements 49, 50 corresponds to the spacing between the arms 22, 24 and bracket blocks 35, 36 and all of the spacers, frame elements and panels of the safety table structure are welded or otherwise securely fastened together to form a rigid box structure. The pivot pin holes 40, 41 are formed in the side webs of the frame channels 49, 50, as shown in Fig. 7.

As best shown in Figures 4, 5 and 6, each of the pivot bracket blocks, as 35 and 36 is of relatively massive construction and may be of rectangular cross section and its outside proportioning is such as to slide easily but relatively snugly into one of the frame channels, pivot block 35 fitting into the frame channel 49 and pivot block 36 fitting into the frame channel 50, through the previously mentioned slotlike openings 42, 43. The rearwardly extending upper terminal portion of each such pivot block is rounded, as indicated at 55, such rounded surface being concentric, or substantially concentric, with the pivot pin, which in the case of the block 35 is designated 38. It will be understood that since the pivot blocks and associated portions are similar at the two ends of the safety table structure, detailed description of one will suffice. The forwardly projecting end of the pivot block is provided with a drilled or otherwise suitably formed hole as 56 adapted to receive the supporting bar as 22, to which the block is rigidly secured. Positioned in the bottom of each of the frame channels as 49 is a stop block as 58 which may be secured in place by welding and which is of such thickness and so positioned as to support the safety table assembly in a desired position, which ordinarily is substantially horizontal, when the safety table is swung downwardly from the position shown in dotted lines in Figure 5 to the position shown in full lines in that view. The stop block 58 is so positioned as to lie somewhat forward of the axis of the pin 38 when the safety table assembly is in such horizontal position. Also positioned in the bottom of each bracing channel as 49 may be a relatively soft bumper as 60 of rubber or the like, somewhat thicker than the stop block 58 and accordingly adapted to engage the underside of the bracket block member 35 prior to the stop block 58, and normally to support the safety table structure, preventing noisy engagement of the blocks 58, 35. Also rigidly secured in each frame channel and bridging and preferably secured as by welding to the side web of the frame channel 49 is another stop block 62, preferably of heavy steel and located relatively close to the rounded nose portion 55 to serve as a stop adapted to limit upward swinging movement of the safety table structure from the full line position of Figure 5 to the dotted line position shown in that view, in which latter position the stop block 62 strikes the top surface of the bracket block 35 to define the limit of upward swinging movement. The angle at which this block 62 is fastened to the channel 49 directly controls the angle at which the whole safety table assembly 12 will stop in its upright movement. This can be changed to suit existing conditions under which the device shall be installed. In case of accident, the impact of occupant is absorbed not only by the pin 38 (shearing action) but also by the blocks 62 and 58 pressing on the top and bottom sides of bracket blocks 35, 36. Even if the pin 38 should be sheared, the block 35 would be pocketed between the blocks 58 and 62 and the rear end of block 35 would then press against the bottom portion of the U channel 49. A structure of great strength is thereby provided, and the design is such that it would be impossible for the block 35 ever to pierce through the assembly 12. The ultimate force is accordingly transferred through the rods 22, 24, etc. to the physical structure of the vehicle itself. Even if the rods 22, 24 should ultimately in a very severe accident bend upwardly, they would thereby even more positively block the occupant against flying forward.

I preferably provide latching means whereby the safety table structure may be latched in the upper position shown in dotted lines at "C" in Figures 2 and 5, but such latching means is so designed that it cannot latch the safety table in the lowered or horizontal position, or interfere in any manner with swinging of the safety table upwardly from the horizontal position to the raised position. Such latching means may comprise a rod as 65 slidable in the safety table structure, in a direction transverse with respect to the car, and in the preferred construction shown it extends from the left end of the safety table where it carries a knob as 66. At its right end, the rod 65 projects through a hole (undesignated) in the left side wall of the frame channel 49. When the knob 66 is pushed in, the inner or right hand end of the rod 65 can move to a position underlying the bracket block 35, but this condition can only obtain when the safety table is raised to the "C" position shown in dotted lines in Figures 2 and 5. At such time the rod prevents return or downward movement of the safety table to the horizontal position. This position is ideal when small children are carried in the vehicle, for they can stand on the seat cushion and hold on to the padded rearward edge of safety table 12, preventing them from striking the windshield or instrument panel in event of sudden stops. When infants are carried, they can be laid on the seat cushion in transverse direction with respect to the car, the safety device forming a padded wall in front of them, so they cannot slide from the seat. Also, when an occupant wishes to sleep with his head on the back cushion, the "C" position affords more room as well as providing a comfortably located rest for the arms and hands. When the safety table is in the horizontal position, the inner or right end of the rod 65 bears against the flat left side of the bracket block 35, so that the rod 65 cannot be moved inwardly. Due to the fact that the left side of the bracket 35 is flat and vertical, the rod 65 cannot interfere with swinging movement of the safety table until the latter has reached a fully elevated position.

If, with the safety table in the "B" position, a front end collision or accident or sudden stop occurs which stops the vehicle so quickly as to endanger the passenger, the effect is to tend to throw the passenger both forwardly and upwardly. If this force is severe enough to throw the passenger, the contact of his body with the safety table assembly carries the rear edge of such assembly upwardly and forwardly, and to the "C" position. The safety table assembly is arrested in this position by engagement of blocks 62 with the upper surface of brackets 35, 36, and holds the passenger against being thrown forwardly into contact with other parts of the vehicle structure. The padded surface 20 of the safety table assembly protects the passenger against injury. As previously pointed out, ratchet means is incorporated to keep the rods 22, 24 from moving forwardly, and the safety table assembly is accordingly held in the protective raised "C" position so long as the passenger's body is forced thereagainst.

The details of the ratchet mechanism are of course subject to variation. A simple preferred construction is shown in Figs. 1, 3 and 4. A series of ratchet teeth 70 is formed along an edge of each slide bar, as best shown in Figure 3.

Each supporting slide bearing tube as 28 is pivoted at the forward end by trunnion means as 31, 32 in a bracket as 85, attached to the rear face of the fire wall 14. The trunnion means does not extend through the interior of the bearing tube. The instrument panel 10 is preferably of arcuate or partly cylindrical form, as shown in Figure 3, the curvature of the instrument panel being substantially concentric with the axes of the pins 31, 32 for the respective tubes 28, 30. The rear ends of the tubular members 28 and 30 carry a sheet metal swinging frame element 86 lying directly forward of and close to the instrument panel and similarly curved, the element 86 being provided with forwardly turned top and bottom flanges 88, 90. In alignment with the internal opening of each of the tubular members 28, 30, an opening as 92 is provided in the swinging frame member 86 through which the rod as 22 is slidable. The swinging frame member 86 is secured to the tubes 28, 30 as by welding, as indicated at 94. In order to provide sufficient travel for the slide bars 22, 24, it may be desirable to allow them to project through the fire wall and into the compartment forwardly thereof (which in most present-day motor car constructions is the engine compartment). For this purpose an aperture as 95 is provided in the fire wall and in the face of the bracket 85, as shown in Figure 3. Each trunnion means 31, 32, consists of a pair of studs secured in and extending outwardly from the opposite side walls of the slide bearing tubes 28, 30, so that there is no interference with sliding movement of the slide bar.

Carried by and rigidly secured to the top of each of the tubes 28, 30, is a sheet metal bracket 96 of inverted U-form in which is pivoted, upon a cross pin 98, a pawl 99 swingable in the bracket in a vertical plane to carry its free end to and from a position, shown in full lines in Figure 3, wherein it projects through a slot 100 in the top of the tube 28 and into inter-engaged relation with the ratchet-toothed portion 70 of the rod 22. As shown in Figures 3 and 4, the pawl 99 is formed of heavy steel and is urged downwardly by a hairpin spring 102 and may be pulled upwardly, against the effort of such spring, by means of a handle 104 accessibly positioned on the face of the instrument panel. Handle 104 is attached to a rod 106 slidably mounted in a bracket structure 105 attached to the instrument panel, the rod and handle being urged inwardly (forwardly of the vehicle) by means of a spring 108. A cable 110 is secured to the slide rod 106, trained over suitable pulley means as 111, 112, 114, and connected at its opposite end to the pawl 99, so that when the handle 104 is pulled, the pawl 99 is lifted free of the ratchet-toothed portion 70 of the slide bar 22. The same handle 104 is similarly connected by equivalent cable means, generally designated 115, to the opposite pawl 113 which coacts with the slide bar 24, so that both pawl means may be simultaneously released when the handle is pulled. The bracket structure supporting the pawl means for the right hand slide bar 24 is generally designated 116. It will be observed that the rear pulley as 112 over which the cable 110 is trained is located close to the pivot means 31 for the tube 28 while a similar rear pulley 118 for the cable means 115 is in like fashion located close to the pivot means 32 for the tube 30. By virtue of this arrangement, vertical swinging movement of the slide tubes 28, 30, may be effected without causing release of the pawl means.

On their lower edge the pawls are provided with a pair of shoulder portions 122, 124, which are spaced conformably to the spacing of the ratchet teeth 70 and positioned to simultaneously engage two adjacent ratchet teeth, so that when the pawls are lowered, the slide bars 22, 24 are firmly held against forward sliding movement. It will be seen that the safety table can be pulled out closer to the passenger, that is, toward the rear of the vehicle, at any time, simply by pulling on assembly 12, but cannot be moved forwardly except when the handle 104 is pulled to release the pawl means 99.

The lower edge of the bracket 105 (Fig. 3) is provided with a flange 125 to the bottom of which a resilient bumper 126 is attached engageable by the flange 88 of the swinging frame member 86 to limit the upward movement of the safety table and its supporting structure. A pair of upright ratchet bars 130, 132 are secured to the swinging frame member 86, one such bar being located near each of the slide bearing tubes 28, 30, and each bar being provided with vertically spaced teeth having downwardly directed abrupt shoulder portions 133 and inclined upper surfaces 134, the toothed portions projecting forwardly of the vehicle, toward the free space under the instrument panel, and being adapted to coact with pawl means as 135 pivoted upon fixed axes. The pawl 135 for the left hand bar 130 is pivoted upon a horizontal transverse fixed pin 136 and urged into holding engagement with the toothed portion of the ratchet bar 130 by a hairpin spring 138. A similar pawl 140 is provided for the right hand vertical ratchet bar 132, such upright pawl and ratchet means being arranged in vertical planes extending longitudinally of the vehicle and the two pawls 135, 140, being simultaneously releasable by means of a single release handle 144 mounted similarly to the previously described handle 104 but in and near the bottom of the instrument panel, through which it extends below a portion of the swinging frame member 86 which is suitably cut out for clearance. The handle 144 is urged inwardly by a coil compression spring 145 mounted upon a slidable rod 146 which also carries the handle 144 and to which a cable 148 is attached, trained over suitable pulley means as 150, 152 and connected at its opposite end to the pawl means as 135. As best shown in Figure 4, the handle 144 is positioned near the center of the safety table supporting structure and individual cable means are provided, both connected to the handle rod 146 and extending individually to the two pawls 135, 140, the cable means extending to the right hand pawl being generally designated 155. It will be observed that by lifting upon the safety table assembly it may be raised at any time to the upper limit of adjusting movement determined by the bumper 126, the pawls 135, 140 ratcheting over the teeth of the bars 130, 132, at such time, but that it cannot be lowered until the pawls are released from such ratchet bars by means of the handle 144 in the manner described.

It is believed that the operation and method of use of my improved safety device will be apparent from the foregoing. When the safety table is pivoted upwardly and pushed forwardly against the instrument panel, as shown in full lines at "A" in Figure 2, the device is completely out of the way, but furnishes an effective crash pad of the flush instrument panel type. As brought out in Figure 2, the dimensions may be such that it extends practically the full vertical height of the instrument panel and when in this position it provides effective protection in certain types of accidents and is especially useful in the protection of small children if they are allowed to stand in the front compartment. When the safety table is pulled to the rear and occupies the position designated "B," or substantially the indicated position (which is subject both to vertical and longitudinal adjustment as previously indicated) the device furnishes a convenient tray-like table for the use of a seated passenger and is effective to hold the passenger in his seat and prevent him from being thrown violently forwardly in event of a crash. In event of a crash which throws the passenger forwardly, the safety table swings to the position indicated at "C" and presents to the passenger a large cushioned surface which arrests his forward motion. It will also be appreciated that the safety table can be latched in the position designated "C" by means of the latching bar 65 previously described to afford the passenger maximum freedom of movement while still providing maximum protective effectiveness. Passengers also find this a comfortable arrangement when leaning back in the seat to rest, because of the freedom to change position and to move the arms and legs without striking the safety table.

With most conventional motor car constructions a portion of the supporting bars 22, 24 which project forwardly of the higher wall 14 will be concealed beneath the hood. There are, of course, certain types of vehicles having a low hood (or no forwardly projecting hood) such as the so-called jeep, and certain types of trucks, and in the case of such vehicles the slide rods and their supporting tubular slide bearing members may simply project forwardly in the open air, as shown in Fig. 48, wherein a jeep-type body is shown fragmentarily. The tubular slide bearing support members 28m and 30m are indicated as fixedly secured to the top of the cowl 475 as by means of fixed supporting blocks 476, 477. The safety table structure is generally designated 12m and the supporting slide bars shown at the left and right are respectively designated 22m and 24m and it will be appreciated that such components may be constructed similarly to those of the first-described embodiment, or varied in details of construction as may be desired. Each of the supports 476 and 477 may also house pawl mechanism which is not illustrated in detail but which may be selectively released by means of a suitable knob as 104m mounted on the instrument panel 11m and connected by suitable cable means as 110m, 115m to the pawl release mechanism. It will be appreciated that these and the other components which may correspond in construction to other embodiments disclosed herein will not required detailed redescription. The safety table is similarly shown as provided with a pocket 29m closable by a cover 23m which in this embodiment is of relatively large size and adapted to provide a smooth surface which may be used as a desk when the cover is closed.

In Figures 8, 9 and 10, I have illustrated a somewhat modified construction adapted to be installed in situations where, as in conjunction with the rear seat of a sedan type motor car, or in multipassenger vehicles, for example, it is not possible to employ slidable supporting bars which project straight forwardly from the safety table assembly. In this embodiment the safety table assembly is generally designated 12a and may be similarly pivotally carried by bracket blocks 35a, 36a, which are in turn carried by slide bars 22a, 24a. The parts of this embodiment thus far described, and other parts designated by reference numerals corresponding to those previously used but distinguished by the addition of the letter "a" to each, will be recognized as essentially equivalent to the similar parts of the embodiment first described, and detailed reconsideration thereof will not be required. In this modification, however, the slide bars 22a, 24a, are bent to arcuate form, and are slidably mounted in conformably curved tubular slide bearing supporting portions 28a, 30a, rigidly carried in appropriately upstanding positions by bracket portions 202, 204, secured to the vehicle floor 205. One such bracket portion is positioned near each side of the car, behind the front seat assembly 15a, the safety table assembly 12a being carried in a position B parallel to the rear seat cushion 206 and the parts being proportioned so that when the safety table and attached rods 22a, 24a are pulled rearwardly, the table may occupy positions generally corresponding to the positions designated B and C in Figure 2 (but with relation to the rear seat). Each of the bars 22a, 24a is provided with ratchet teeth as 70a upon its side facing toward the center of the vehicle.

It will be noted in this connection that the curvature of each supporting tube as 28a and slide bar as 22a lies in a vertical plane extending longitudinally of the vehicle. Attached as by welding to the side of each of the tubes 28a, 30a nearest the center of the vehicle, and projecting inwardly in that direction, is a sheet metal bracket 96a. Within each such bracket is a pawl as 99a pivoted upon a pin 98a and adapted to coact with the toothed portion as 70a of the slide bar. A spring 102a urges the pawl toward the engaged position in which it holds the slide bar against movement in a forward and downward direction. When the pawls appurtenant to the two supporting tubes 28a, 30a are simultaneously released, the safety table may be moved downwardly and forwardly from the "B" position shown in full lines in Figure 8 to the retracted "A" position in which it lies substantially flat against the rear of the front seat 15a, as shown in dotted lines in that view.

The upper ends of the supporting tube portions 28a, 30a are connected by a tubular cross brace 208 suitably attached as by the bolt 210 to a bracket portion as 212 projecting rigidly in an inward direction from each supporting tube. Cables as 110a are attached to each pawl, as shown in Figure 9. Each cable is trained over suitable pulley means as 114a, 112a and extends into the interior of the cross brace 208 and in an inward direction to a position substantially at the center of the car, where the cables emerge through an opening 214 in the side of the tube, the ends of the cable being attached to an actuating lever 215 supported in a connector bracket structure 216 which bridges and rigidly connects the portions of the tubular cross brace upon opposite sides of the opening 214 and which pivotally supports the lever 215 for swinging movement about a transverse horizontal axis upon a pivot bolt 220. The tubular bracket portions 216 which encircle the cross brace tube 208 are secured thereto by pins as 222 over which, within the tube are fitted freely rotatable sleeves 224 serving as pulley means over which the cable is trained. A knob-like actuating handle 225 is attached to the lever 215. The axis of pivot bolt 220 is spaced from the axis of the cross brace 208 and the lever 215 extends at an angle to a plane which is extended through both of these axes, so that when the lever is swung the cables are pulled to release the pawls which coact with both of the rods 22a, 24a. Preferably the lever extends at such an angle that when the knob 225 is moved to the released position, the lever moves over center so that it will stay in that position. If desired, the knob may also be positioned so that one face thereof, such as the round flat face designated 228 in Figure 8, is only visible when the knob is moved to the position in which the pawls are released. This face of the knob may be painted bright red or otherwise marked with a warning designated to show that in such position the safety table holding pawls are released. When the knob is moved forwardly, with the parts arranged as shown in Figures 8 and 10, the cables are permitted to move outwardly, allowing the pawls to engage under the influence of their springs 102a. The warning face 228 of the knob 225 is then no longer visible from the rear seat.

Although in this embodiment, I have not provided for vertical adjustment of the positioning of the safety table to compensate for passengers of different size, it will be seen that as the table is pulled farther to the rear from the position shown in Figure 8 it moves downwardly toward the seat, which provides automatic adjustment for smaller passengers.

The operation of this embodiment will be recognized as corresponding to that of the embodiment first described and will require no detailed reconsideration. In event of an accident which arrests the forward movement of the vehicle too abruptly, the passengers' momentum may swing the safety table to the C position shown in dot-dash lines in Figure 8, where he is effectively held against being thrown forwardly.

This installation would be ideal where the sides of the vehicle in question are not strong enough to afford sufficient protection in case of accident and where the front seat could not stand the combined momentum of passengers. It has the advantage that even if the sides of vehicle should be damaged, it would still function, because it depends only on the floor panel for support.

In Figures 11 and 12 I have indicated somewhat diagrammatically a further modification, also adapted to protect the occupants of the rear seat of a motor vehicle of the four-door sedan type. Such vehicles are provided near the middle of each side with vertical posts. Ordinarily in present day motor car construction, the rear doors are hinged to such posts while the rear free edges of the front doors strike such posts in closing. In the parlance of body designers, such posts are known as "B-posts," and in the present modification the protective device is adapted to be supported by such B-posts (which may be suitably strengthened) upon opposite sides of the car by a frame structure which is so constructed that the safety table may be moved from a stored or retracted position A in which it lies flat against the rear of the front seat to the normal position of use (B position) wherein it extends transversely of and relatively close to the rear seat, and provides the full potential protection. In the modification of Figure 11, the safety table assembly is designated 12b and it is pivoted upon bar portions 230 and 231 which are straight and colineal and extend transversely of the car throughout the full length of the interior of the safety table and are joined by union 232. The bar portions 230 and 231 are also employed in place of the pivot bolt means 38, 39 shown in the first embodiment. In my preferred construction the cross bar structure formed of sections 230 and 231 projects a short distance from both ends of the safety table, and integral with each projecting end is a side bar portion 235, each such side bar portion being connected to the adjacent B-post. When in the B position shown, the part of the side bar portion closest to the safety table extends forwardly and downwardly in a curved line and terminates at the B-post 236, to which such end of the bar is pivoted as upon suitable pivot means 238. A collar assembly generally designated 240 is slidable upon the side bar portion 235 of the supporting bar structure. A supplemental bracing bar 242 is pivotally connected to the collar assembly 240 as by a pivot bolt 244. The bracing bar 242 extends angularly upwardly to pivotal connection with a pivot pin 245 fixedly carried by the B-post at a point spacedly above the pivot 238. As best shown in Figure 12, the collar structure 240 may be of split construction and adapted to be clamped as by a clamping screw 246 operable by a handle 248 to lock the collar against sliding movement along the bar portion 235. When the clamping nut is tightened the triangular arrangement of the structure defined by the two bar portions 235, 242 and coacting part of the B-post 236 rigidly supports and positions the cross bar portions 230, 231, and so the safety table in the protective position. The spacing of the pivots 238, 245, somewhat exceeds the length of the bracing bar 242 so that when the clamping screw 246 is loosened and the collar 240 is moved inwardly of the bar portion 235 toward the pivot 238, the bar portion 235 is swung upwardly, its ultimate position being substantially vertical, as shown in dotted lines in Figure 11, at which time the safety table may be swung to the substantially vertical position "A," as also shown in dotted lines, wherein it lies flush against the back of the front seat.

In this embodiment I employ a bracket block 250 rigidly secured to the cross bar portion as 230 within the hollow interior of the safety table structure and adapted to coact with stop blocks as 252, 253 secured to the safety table channel 49b to limit the swinging movement of the safety table assembly 12b on the bar structure 230, 231.

This assembly is similar to the one shown in Figs. 45 and 46 except that the part 230 carries through to permit the assembly of 230 and 250 to slide into the safety table 12b, channel 49b is apertured on the side, and plate 233 conceals the assembly and revolves freely around bar 230. Ash tray 21b in the middle of the safety table 12b is so located that upon its removal, union 232 can be reached.

This modification would provide for the most economical installation of my safety device while still affording full measure of protection in either retracted or extended position.

In a further modification shown in Figures 13, 14 and 15, the safety table, designated 12c is carried by a bar structure of generally U-form having a straight transverse portion 230c and substantially straight side portions 235c at right angles to the transverse portion 230c which extends through the safety table. The supporting portions 235c of the bar are slidably mounted in tubular slide bearing supporting portions as 28c which are attached to the vehicle frame structure as on the B-post 236c for pivotal movement about an axis transverse of the vehicle, as by means of pivot pins as 238c. In this embodiment the pivot axis defined by pin means 238c is located higher than the positioning of the pivot 238 of the embodiment of Figure 11. The tubular slide bearing support portion 28c is rigidly attached to a rotatable annular section 255 which turns therewith upon the pivot bolt 238c except when such pivotal movement is prevented by clamping means hereinafter to be described. The annular portion 255 is provided with annularly disposed serrations 256 upon its outer face to coact with similarly disposed stationary annular serrated portions 258 mounted upon the B-post and concentrically surrounding the pivot bolt. The pivot bolt threaded into a suitably tapped hole 239 in the stationary section 258, these parts being so arranged that when the handle 260 is turned in one direction bolt 238 clamps the portion 255 against the stationary portion 258 to lock the portion 255 and so the tubular slide bearing 28c against pivotal movement while when the handle 260 is moved in the opposite direction the part 255 is freed so that the tubular portion 28c, and the safety table may be swung bodily in a vertical direction.

The tubular slide bearing support portion 28c also carries a supporting and housing bracket structure 96c for pawl means generally designated 99c engageable with ratchet toothed portions as 70c formed along the upper edge of the rod portion 230c. The pawl means as 99c may be connected by suitable cable means as 110c to the actuating handle 260 so that when the handle is moved to release the clamping engagement of the portions 255, 258, the pawl is also pulled from the ratchet-toothed portions so that the bar portions 235c may be slid through the tubular slide bearing supports 28c. It is thus possible, by manipulating the single handle 260, to release the safety table both for vertical adjustment and to permit sliding the same toward and from the back of the front seat. It will be understood that one such clamping and pivotal supporting mechanism is provided upon each side of the car and that the handle portions thereof, corresponding to the handle 260 must in this construction be individually operated.

In the further modification shown in Figures 16 and 17, the safety table 12d is supported in a manner analogous to that in which the safety table 12c is supported in the embodiment last described but the point of pivotal connection of the supporting bracket means to the B-posts of the body structure is so located and the main supporting side bar portions 235d are of such length and so proportioned that in the stored position, the safety table structure may be moved upwardly to lie closely beneath the roof of the vehicle. The safety table may of course be contoured to conform to the interior shape or curvature of the roof of the car.

In the embodiment of Figures 16 and 17, the limits of pivotal movement of the safety table assembly, designated 12d, on the crossbar portion 230d are determined by integral stop plates as 250d of angular form, one of which is rigidly secured to and projecting upwardly from each end of the safety table assembly. Each plate is so located that its bent portion is substantially concentric with the axis of the crossbar portion 230d, one portion designated 272 of such plate extending substantially horizontally above the side bar portion 235d (when the safety table is in its B position) while a rear portion 274 of the stop plate extends angularly downwardly and rearwardly, behind the crossbar portion 230d of the bar. By virtue of this arrangement the safety table assembly may be pivoted in a direction to carry its rear end downwardly and its forward end upwardly, from the position shown in full lines in Figure 16 to the position shown in dotted lines in that view, in which latter position it is arrested by engagement of the plate portion 274 with the underside of the side bar portion 235d. When in the horizontal position the portion 272 keeps the front end of the table from dropping.

In this embodiment it will be seen that the safety table assembly 12d is pivoted nearer its rear edge than its front edge, and the pivot stop plate 250d is so arranged as to only permit the safety table to pivot upwardly at the front from the horizontal position shown in Figures 16 and 17 in full lines. I have found from operation of these devices that when the forward motion of the car is arrested suddenly enough to throw the passenger against the safety table, the safety table will be induced to move pivotally in either direction which the pivot means may permit. The ultimate effect is therefore similar whichever way the safety table pivots, in that the safety table swings to a substantially vertical plane and then presents to the body of the passenger a wide surface, as indicated in dotted lines in Figures 16 and 17, so that not only is the passenger held in his seat, but the force developed by his momentum is spread over a wide area of the safety table, thereby greatly minimizing the hazard of injury to the passenger. One advantage of this design is that it permits the pivoting bar as 230d to be located in the rearward third of the assembly 12d, thus decreasing substantially the distance occupant's body has to travel before being cushioned against assembly 12d.

In Fig. 17 I have also shown a modified mechanism for releasably holding the safety table in the angular position with respect to the supporting arm 235d. It will be apparent from the showing in dot-dash lines Ad in Figure 16 that the safety table must be maintained in a position substantially perpendicular to the supporting arm when it is stored against the roof of the car. A simple articulated link structure may be provided for this purpose, consisting of a pair of links 280, 282 having adjacent ends pivoted together by pivot means 284, the link 280 being pivoted at its other end to the safety table by pivot means 285 while the link 282, at its end remote from the pivot 284 is pivotally connected by pivot means 286 to a bracket 288 rigidly secured to the side arm portion 235d, the length of the links and positioning of the pivot means being such that when the safety table 12d is parallel to the side arms, the links are folded about the pivot 284, so as to lie close to one another, while when the safety table reaches the desired limit of its tilting movement with respect to the side arms, the links reach the straight line position and arrest such tilting movement. Sufficient friction may be provided in the pivot means to oppose return of the safety table to the parallel position until the links are manually moved out of the straight line position, as will be apparent, or they may be made to travel just past the straight line position in other directions, just enough to lock themselves securely.

The mechanism for pivotally supporting the bar structure and for releasably clamping the same in different adjusted positions may correspond to the construction depicted in Figures 14 and 15, as will be appreciated.

In Figures 18, 19 and 20 I have shown a modified adjustable pivot type supporting and clamping mechanism adapted to perform the same basic operations as the structure shown in Figures 14 and 15 but wherein the tubular slide bearing support portion 28e is formed as a rigid extension of a plate section 255e pivoted as by pivot bolt means 238e at the center of a sector plate 258e having a concentric arcuate slot 290 formed therein near its periphery and adapted to be secured as by screw means 292 to the B-post of a motor vehicle body structure, or to other suitable supporting means in installations which may be incorporated in different environments. Pivoted in a pair of outwardly projecting vertically spaced lug-like portions 294, 295, shown as formed integrally with the plate section 255e is a swingable handle 296, rigidly attached to a combined pivot bolt and clamping screw 291. A cam portion 298, best shown in Figure 20, is formed integrally with the handle at the pivoted end thereof and (presses on friction plate 299 fitted into plate 255e, thus gripping plate 258c in a vice-like effect between plate 299 and backing portion 300 of plate 255e) when the handle 296 is swung to a position wherein it lies substantially parallel and close to the plate 255e. The cam is releasable from the sector plate by swinging the handle outwardly to the dotted line position of Figure 20. The parts are so proportioned that when the handle is moved to force the cam 298 into engagement with the friction plate 299, the cam grips the sector plate 258c so tightly as to effectively lock the pivoted portions and thereby the rod structure and the safety table supported thereby, against pivotal movement about the pivot bolt 239e. Backing portion 300 of plate 255e, also of flat platelike form, is integral with the front plate portion 255e but extends behind the sector plate 258e, being joined to the front plate portion 255e by a bridging portion 302 which extends around the edge of the sector plate. In order to limit the range of sliding adjustment of the safety table and its supporting bar structure in the tubular bearing support portions 28e, abutments as 304, 305 are secured to the rod portion 235e at suitably spaced positions as shown in Figure 18. As best shown in cross section in Fig. 19, the lower lug-like portion 295 is actually of hollow box-like form, having a substantially rectangular internal opening 301 therein in which a pair of rectangular clamping blocks 303, 307 are loosely fitted. A portion of the side bar section 235e extends through the internal openings 301 and the clamping blocks 303, 307 are contoured to embrace opposed upper and lower portions of such part of the bar which project into the opening. The clamping screw 291 projects freely through the upper clamping block 303 but is threadedly interengaged with a suitably tapped opening 309 in the lower clamping block 307. When the clamping screw is rotated by swinging movement imparted to the handle 296, the lower clamping block 307 is moved up or down within the chamber 301, the arrangement of the part being such that when the handle is moved to the position shown in full line in Fig. 20 (wherein it lies close to the plate 258e and, as previously explained, clamps the supporting bar structure against rotation about the pivot 239e) the clamping block 307 is simultaneously drawn tightly upwardly against the lower portion of the bar section 235e, to thereby tightly clamp such bar against sliding movement in the tubular slide bearing portion 28e. Conversely, when the handle is swung outwardly to release the pivoted structure and the supported bar portion so that these parts may be swung about the supported pivot bolt means 239e, the lower clamping block is moved downwardly to free the bar structure 235e so that the latter may also be slid inwardly and outwardly at will in the tubular supporting slide bearing structure 28. It will thus be seen that by means of the single handle 296, the supporting structure for the safety table is completely freed so that the table may be adjusted both vertically and horizontally, while to tighten it in any such adjusted position it is only necessary to swing the handle back toward the plate 258e.

In the further modification shown in Figures 21 and 22, the safety table assembly generally designated 12f, is pivoted upon a generally U-shaped supporting bar structure essentially corresponding to the bar structure of the embodiment shown in Figure 11, the side arm portions 235f of such bar structure being connected by pivot means 238f to a supporting structure which is indicated as comprising the back assembly of a cushioned seat, generally designated 15f. Such a supporting arrangement is adapted for installation in vehicles having a plurality of seats solidly fastened to the vehicle arranged one behind another as in trains, busses, and airplanes, although it could also be used in private automobiles. The side arm portions of the bar structure, connecting the safety table to the pivotal supporting means 238f, may be curved upwardly as shown in Figure 21, and a bracket 240f is rigidly secured to an intermediate portion of the side arm 235f. A bracing arm 242f is pivotally connected by means of a pivot pin 244f to the bracket 240f. At its forward end the bracing arm 242f is connected to a pivot pin 308 which is slidable in a generally vertical direction in an arcuate slot 310 formed in a supporting slide plate 311 carried by the seat-back structure. The length and arrangement of the arms and of the slot 310 are such that when the slidable pivot pin 308 is at the lower end of the slot 310, the corresponding end of the safety table is supported in the protective passenger-restraining position shown in full lines in Figure 21, while when the slidable pivot is moved to the upper end of the slot, the safety table is swung upwardly and lies flat against the rear of the seat back structure 15f as shown in dotted lines. Latching means are provided, one located appurtenant to each end of the slot 310, for latching the slidable pivot at either end of the slot. As best shown in Figure 22 the latch at the lower end of the slot comprises a pivoted latch piece 312 swingable from a position shown in full lines wherein it blocks upward movement of the slidable pivot bolt 308 to a position (shown dotted) free from blocking overengagement with such bolt. The latch piece 314 at the upper end of the slot is of like construction and is pivoted upon a pin 315 for analogous swinging movement to and from a blocking position, to which it is urged by a hairpin spring 316. The pivot pin for the lower latch piece 312 is designated 317 and the hairpin spring by which it is urged to the latched position is designated 313. Both the lower latch piece 312 and the upper latch piece 314 are connected to a single actuating handle 320, by suitable connecting means such as the cables 321, 322 which are trained over suitable pulley means as 324, 325. In the preferred construction shown, the handle 320 is pivoted upon a pin 326 which is substantially parallel to the seat so that when the handle is pulled outwardly away from the seat back the latch pieces are released, permitting the table and its supporting link structure to be moved either upwardly or downwardly. As such upward or downward movement is completed (the latch handle 320 at such time being free), the parts are latched in the new position and will be rigidly held there until again released to permit movement of the table in the opposite direction. It will also be understood that in this, as in the other embodiments, like mechanisms are preferably provided at both ends of the table although only the mechanism at one end is described, and again it will be appreciated that the latching mechanisms for both ends may be simultaneously operated by the single centrally located handle 320, to which all of the cable means may be connected.

As best brought out in Figure 23, the stop means for limiting tilting movement of the table assembly 12f may comprise angular plate-like abutment portions of heavy construction projecting perpendicularly from the end of the table structure adjacent the section of the supporting crossbar portion 230f which projects from the end of the table. The abutment plate portions extend farther from the table than does the bar in a lateral direction so that such stop plate portions limit pivoting movement of the table about the bar by engagement with the side bar portion 235f. One portion designated 272f extends substantially parallel to the plane of the table and lies beneath the sidebar portion 235f when the table is horizontal, while a portion 274f lies substantially perpendicular to the plane of the table and is located substantially vertically when the table is in horizontal position. The portion 274f limits the upward tilting movement of the rear edge of the table by engaging the top of the bar portion 230f at the completion of such tilting movement. The portion 272f maintains the table in the desired substantially horizontal position of normal use.

In the further modification shown in Figures 24, 25, 26 and 27, the table assembly 12g is carried by a supporting bar structure which is indicated as formed in two sections, although it obviously could be of U-form essentially like the arrangements of the embodiments of Figures 13 and 16, but the side arm portions 235g extend rearwardly from the table rather than forwardly, this construction being adapted for installation in such manner that the side arm portions are attached to the vehicle body or frame structure behind the front edge of the rear seat cushion and at a relatively high position. In the body construction shown, the vehicle is assumed to be a sedan. The rear seat is designated 206g. The side arms 235g may extend angularly upwardly and rearwardly upon opposite sides of the seating space and are attached to pivotal supporting structures, one of which is attached to the body near each upper rear corner of the seat back cushion, as, for example, in the space between the side window or quarter window 330 and the back window 332. The pivotal supporting means may be similar to the constructions shown in Figures 14 and 15 or 18, although it will also be appreciated that it may be varied in other respects, and in a preferred construction shown in Figures 25, 26, 27, each straight side bar portion as 235g is slidably projected through a suitable slide bearing and support portion 28g. Portion 28g is rigidly carried by and shown as formed integrally with a housing portion 255g rotatably mounted upon a pivot bolt 238g fixedly supported by the vehicle structure as previously indicated and in the construction depicted being mounted in a generally circular fixed casing portion 258g, such casing portion and the rotatable casing portion 255g being formed with opposed oppositely inwardly facing and coacting internal chamber portions defining a generally cylindrical internal space 317 within which is a toothed wheel 290g fixedly attached to the pivot bolt 238g so that it cannot rotate thereon. A portion of the casing structure 255g adjacent the toothed wheel 290g is formed as a hollow section 319 communicating interiorly with the chamber 317 and serving as a housing for a toothed dog 138g slidable therein to and from holding engagement with the toothed edge of the wheel 290g. The dog is movable by means of the handle 296g which is rigidly attached to and pivotally mounted in the housing structure by means of a stem portion 291g. The stem portion 291g is pivoted upon a transverse axis in the housing structure. A cable 148g is attached to the stem portion 291g at one end, trained over a suitable guide or pulley 150g and connected at its other end to the dog 138g so that when the stem 291g is turned by means of the handle 296g the dog may be pulled from engagement with the cooperatively toothed surface of the wheel 290g, or alternatively permitted to move into holding engagement therewith under the influence of the dog spring 135g, which acts in compression and is also housed within the casing portion 319. The stem portion 291g is also provided with a threaded section (undesignated) adapted to coact with clamping block portions 303g and 307g. The clamping block sections 307g and 303g are adapted to tightly frictionally engage the bar portion 235g to hold the same against sliding movement in a manner analogous to the operation of the corresponding portions 303 and 307 of the embodiment of Figs. 18–20. The threaded portion of the stem 291g is threadedly interengaged with a correspondingly internally threaded portion (undesignated) in the clamping block portion 307g, while the block portion 303g may be rigidly secured to and is shown as formed integrally with the handle 296g, these parts being so arranged that when the handle is turned in a direction to draw the two clamping block portions 303g, 307g together to grip the bar portion 235g, the tension is relieved upon the cable 148g to permit the dog 138g to engage the toothed wheel 290g, while when the handle 296g is turned in the opposite direction to release the clamping blocks from the bar portion, the cable portion 148g is wound upon the stem portion 291g to pull the dog from engagement with the toothed wheel so that the assembly is freed for pivotal movement at the same time that the bar portions are freed for longitudinal sliding movement, whereby complete adjustment of the positioning of the safety table is permitted, or alternatively the same may be rigidly locked, by selectively moving the handle portions 296g at the opposite ends of the assembly in corresponding directions.

The parts of this embodiment are also proportioned so that when the table is swung upwardly about the main supporting pivot means 238g for the supporting bar structure, the table may lie close to and substantially flat against the interior of the roof of the vehicle for out-of-the-way storage and to permit the passengers to enter and leave the seat. The interior roof panel, which is generally made of flexible material such as cloth, could be shaped in such a way as to permit the assembly 12g to fit into a recess, presenting a fairly flush appearance as suggested by dotted line in Fig. 24. It will be appreciated that this embodiment is so arranged that when the table is lifted out of the way in this manner, no interference with the entrance and egress of passengers is presented, while the arrangement of the side bar portions 235g so that they extend on either side of the passengers afford extra protection in that passengers are held from the sides as well as the front and rear and so cannot be thrown out through a side door of the vehicle.

The embodiment illustrated in Figures 28, 29, 30 and 31 is adapted for installation in conjunction with a seat having either fixed side panels or door panels upon either side of the seat. In Fig. 28 a side panel 333 is shown, which is presumed to constitute one of two such panels located at opposite sides of the seat. Rigidly attached to panel 333 is a supporting plate 334, which extends longitudinally and angularly upwardly toward the front, as seen in Fig. 28. A flat face portion 335 of the plate element 334 lies parallel with the panel 333 and is provided with an exposed slot 336. A slide block assembly 338 is retained in the slot but slidable therein longitudinally of the vehicle. Block 338 may be held against such sliding movement, or released, at will, by manipulation of a handle 340 pivoted about a stud 345 and swingable counterclockwise from a lowered position shown in full lines in Figures 28 and 29 to an open position indicated in dotted lines in Figure 29. When in the lowered position, the block 338 is locked against sliding movement in the slot 336 while when the handle is in the open position the block may be slid. Clamping of the block against sliding movement is effected by means of a clamping plate 344 which is vertically serrated and located behind the slotted portions of the plate 335, which is also vertically serrated, stud 345 being securely welded to plate 334. A tapped hole 346 in handle 340 is threadedly fitted on stud 345. The threaded interengagement of the stud and handle is such that when the handle is moved forwardly and downwardly the serrated block 344 is drawn tightly against the serrated back of the slotted plate portion 335, which slotted plate portion is then tightly clamped between the block 344 and the block 338. Helper spring 342 is placed between plates 334 and 344, so that when the handle 340 is released, the serrated parts will disengage and permit easy movement.

Also formed in the block portion 338 is an arcuate slot 348 which is open at its upper end at the top of the block portion 338 and which extends downwardly and forwardly in a curve from its open top end. Behind the slot 348 a cutout recess 350 is formed in block 338 into which recess the slot 348 opens. The recess 350 is also open at the top of the block portion 338 and such recess and the upper end of the slot 348 are covered by the handle 340 when the latter is in its lowered, clamping position. The slot 348 is proportioned to slidably receive the straight transverse bar 230*h* which supports the safety table assembly 12*h*, which is illustrated only fragmentarily. In this embodiment the safety table is rigidly connected to and turns with the straight supporting crossbar 230*h* and attached to the end of the bar is a fixed sector-shaped abutment plate 352 which is adapted to fit into the recess 350 as the bar 230*h* slides into the slot 348. It will be recognized that one such complete assembly is provided at each side of the seat, on each of the door or side panels, and that the bar 230*h* is of such length that the abutment portions 352 at each end thereof are adapted to simultaneously fit into the corresponding recesses 350 of each such side assembly at the same time that the portions of the bar adjacent such abutment plates 352 slide into the slot 348. The recess 350 is so proportioned as to permit angular movement of the abutment plate 352 therein to an extent conforming to the desired maximum tilting movement of the safety table and to stop the safety table at the desired positions, one of which is substantially horizontal and the other substantially vertical, as in the previous embodiments. The extent of such angular movement is indicated in Figure 29 by broken lines.

In event of a crash which suddenly stops the vehicle, the bar 230*h* is tightly held in the supporting block portion 338 and even if sufficient force should be exerted against the safety table to bend the bar, the bar cannot escape from the slots because the abutment portions 352 act as heads on the bar, overlying the rear of the slotted portions 348 and preventing the ends of the bar from being pulled from the slots. In order to gain access to the seat it is necessary to raise the handles 340 at the opposite ends of the bar and lift the safety table, with the bar attached thereto, from the blocks 338, as will be appreciated.

In order to facilitate its removal and storage, the safety table assembly may be formed in two sections, as best seen at 12*h* in Figs. 30 and 31. As therein indicated, the sections are of equal size and are hingedly connected to one another by means of a central hinge of rugged construction which, as indicated, may be in the nature of a heavy piano-type hinge 452, the hinged sections being so arranged that at the limits of relative swinging movement of the sections they may either lie in a common plane, as shown in Fig. 30, to form a safety table corresponding in its general proportions and characteristics to the safety tables of the previously described embodiments, or may be folded, book fashion, to the condition indicated in Fig. 31, so that the assembly is only half as long and is accordingly easier to carry and to stow. Constructions of this foldable type are especially adaptable for use in cars having convertible bodies and the case with which the safety table may be bodily removed from the car renders it useful as a seat for picnicking or the like. I preferably provide in connection with such a foldable safety table a bolt mechanism of rugged construction by which the two sections may be releasably held in the planar relationship of normal use. Such bolt mechanism may conveniently comprise a slidable supporting bar portion 454 carried by ears 455 which project from one of the sections of the foldable safety table. When the table is open to the planar condition, the ears 455 project into relieved portions as 456 in the other section of the safety table. A plurality of lock bolt portions as 458 are carried by the supporting bar portion 454 and are laterally offset from the main portion of such bar, and positioned in such manner that when the bar is moved in one direction, the lock bolt portions 458 may project into suitable sockets 460 formed in earlike projecting portions 462 located between the relieved portions 456. Such bolt portions 458 also project slidably through the ears 455 so that when such bolt portions extend into the sockets 460 they rigidly bridge the ears 455, 462 and lock the sections of the safety table against pivotal movement with respect to one another. The bar 454 is slidable by means of a suitable handle 464 attached to one end thereof and accessible at an edge of the safety table.

I have also shown in Figures 28 and 29 means for latching the safety table assembly 12*h* in a more nearly vertical position, comprising a pin 355 vertically slidable in the handle 340 to and from a position wherein it projects downwardly into the recess 350 to block the abutment portion 352 when the latter has been swung to the position corresponding to the more nearly vertical position of the safety table. As will be appreciated from Figure 29, at such time the abutment 352 cannot swing in the opposite direction to permit the safety table to resume the horizontal position, but by lifting the pin 355 by means of the knob 356 attached to the upper end thereof, the pin may be moved out of the way to permit the safety table to tilt back to the horizontal position. By virtue of the fact that the pin 355 is slidably supported in the handle 340, when the handle is raised, the pin offers no interference to removal of the table assembly from the supporting blocks 338. Spring 357 tends to hold the pin always in lowered position.

The embodiment shown in Figure 33 is also adapted for installation in public vehicles, the protecting device for each seat being adapted to be carried by the frame structure of a seat in front of it. The frame structures of the seats are of course of sufficient rigidity, and the seats secured to the floor by means of sufficient strength, to withstand the extra strain which might be applied in event of an accident. The seat structure, generally designated 15*j*, is provided with arm rests as 333*j* which are of hollow construction, the entire seat structure being shown as carried by legs 360, 361, adapted to be rigidly attached to the floor. The safety table assembly 12*j* is carried by a generally U-shaped bar structure having side arm portions 235*j* which are curved to extend upwardly and rearwardly substantially in the planes of the arm rests 333*j*, and spaced conformably to such arm rests. At its lower end each side arm portion is pivoted to a portion of the frame structure of the seat, by means such as the pivot pin 362. Each side arm portion 235*j* extends through a slot as 364 formed in the top of the arm rest and the length and path of movement of the side arm portions 235*j* is such that the safety table may be swung from the lowered position shown in full line in Figure 33 wherein it is adapted to protect the occupant of a seat behind the seat 15*j* in the manner previously described, to a stored position shown in dotted lines wherein it lies flat against the back of the seat 15*j* near the top thereof. A pair of bracing links 365, 366 are provided centrally pivoted together as at 368, the rear end of the link 366 being pivoted to the arm portion 235*j* at a point spaced above the main pivot 362 but within the hollow arm rest 333*j*, such pivotal connection being provided by a pivot pin 370. The link 365, at its forward lower end, is pivoted as by means of a pin 372 to a portion of the frame structure, also within the arm rest. I preferably incorporate stop means so arranged that the central pivot 368 of the links 365, 366 may be moved down to a limit position slightly below a straight line drawn between the centers of the pivots 370, 372, but cannot be moved downwardly below such limit position, which constitutes a bracing position. Such stop means is not illustrated since such devices are well-known and of such simple character and may easily be incorporated as appurtenances to the pivot means 368. It will be appreciated that when the links are in the bracing position, no amount of force applied to the safety table can cause the links to swing about their pivots, so that the safety table is effectively held in the protective position.

I may also provide power operated means for moving the safety table between the A and B positions. In this embodiment I provide a servomotor 375 in the form of a hydraulic cylinder and piston assembly having a connecting rod 376, the outer end of which is pivotally attached to the central pivot 368 which joins the links 365, 366. At the other end the cylinder 375 is pivotally attached to the pivot portion 362. Suitable conduits as 377, 378 are provided leading to the upper and lower ends of the cylinder respectively above and below the piston therein and it will be appreciated that by delivery of hydraulic fluid through the conduit 378 the rod 376 may be projected to fold the links from the extended position shown in full lines in Fig. 33 to a folded position indicated in dotted lines, and thereby to move the safety table assembly from the B position to the A position, while conversely by delivery of fluid to the cylinder through the conduit 377 the retraction of the rod 376 moves the links downwardly to the full line position wherein they are self-bracing as previously indicated and wherein the safety table is supported in the B position. Similar servo units are, of course, provided for both ends of the assembly and a single conventional control valve as 380 may be carried by the back of the seat structure 15*j* to control both units. A detailed description of such parts will not be required inasmuch as they are well known in the art. The supply conduit for the hydraulic fluid from the source is indicated at 382. The control valve is operable by means of a suitable handle 320*j* projecting accessibly from the back of the seat structure.

In the embodiments shown in Figures 34 and 35 parts analogous to those described in connection with the last disclosed embodiment are designated by like reference numerals distinguished by the suffix "*k*." Many of these parts will require no detailed redescription and it will be noted that the structure is essentially similar except that the foldable bracing links are not employed, and in lieu thereof the main supporting side arm portions 235*k* which carry the safety table are controllable in their swinging movement by novel ratchet mechanism which may also be entirely housed within and concealed by the hollow arm rests 333*k* of the seat. Beside the path of movement of the swingable side arm portions 235*k* and rigidly carried by the seat structure is a stationary ratchet plate 390 having teeth 392 lying substantially on radial lines which if projected would converge at the axis of point 362*k*. Teeth 392 face the path of movement of the supporting side arm 235*k*. Pivotally attached to the side arm 235*k* to move therewith and to swing thereabout is a dog 394, which in the preferred construction shown is simply fitted over and pivoted upon the side arm. The dog 394 is provided with one or more teeth 395 proportioned to interfit with the teeth 392. A hairpin spring 396 urges the dog in a direction to induce its toothed portion to engage the teeth 392 of the ratchet plate 390 and when the teeth are so engaged, the supporting arm 235*k* is held against movement and the safety table is accordingly rigidly positioned, either in the guarding "B" position shown in full lines in Figure 34 or in the "A" position shown in dotted lines. Selective release of the dog is effected by means of a handle 384*k* which is connected as by cable means 387 to a portion of the dog remote from its pivotal connection to the supporting arm 235*k* so that when the handle is turned the dog may be released to permit movement of the safety table between the A and B positions. Again it will be appreciated that similar arrangements may be provided for supporting and controlling the actions and movement of both ends of the safety table and the dogs at both ends of the seat may be simultaneously actuated by the same handle 384. This embodiment by virtue of the provision of a plurality of teeth 392 can be adjusted in many positions by allowing the dog 394 to be locked in a choice of locations. In Fig. 36 I have shown a somewhat simplified arrangement wherein only two positions are possible. This construction is essentially similar to the one described in Figs. 21–22 as will be appreciated upon examination and therefore will need no further explanation, but the two-position latching mechanism is housed within the hollow armrest 333*n*. Other parts of this embodiment corresponding to parts already described are designated by like reference numerals distinguished by the suffix "*n*." Also, modifications shown in Figs. 33, 34, 35 and 36 can be installed in conventional sedans simply by mounting the same on the floor adjacent to the "B" posts instead of in the armrests. It is understood that the arms 230—231 would be longer to reach the floor and the assemblies shown in Fig. 35 or 36 would be attached to the structural side of the vehicle instead of the armrests.

As mentioned previously herein, I have found from actual use of protective devices constructed in accordance with the present invention that the safety table may be pivoted to swing in either direction to present a flat surface to the chest of the protected passenger in the event of a crash. Such factors as proximity of my device to the body of occupant, his physical proportions, and the position in which he happens to be at the moment of impact all have their effect. In Figures 37 and 38, I have shown a modified mounting for the safety table so constructed that the table is free to swing in either direction from the substantially centered, flat "B" position. The direction in which it swings will of course be governed by the direction of the first impetus given thereto by the momentum of the passenger at the time of the crash. In this modification the safety table, generally designated 12L, is carried by a supporting bar structure having side portions 235L and a cross pivoting portion 230L which projects from the ends of the safety table and about which the table is pivoted. The stop means for limiting such pivotal movement of the table may consist of a platelike projection generally designated 250L which is rigidly connected to and extends from the end of the safety table perpendicularly to the plane thereof, and is spaced from the projecting portion of the straight cross rod portion 230L a distance such that the stop plate engages the side arm portion 235L, to arrest pivotal movement of the safety table, when the table swings substantially 70° (or any predetermined angle) in either direction from the "B" position shown in full lines in Figure 37 wherein it lies more or less parallel to the side arm portions 235L. I preferably provide means for yieldably holding the table in such parallel position with respect to the side arm portions 235L. Such holding means may be of the character of a detent structure, shown as comprising a yoke member 400 of generally Y-shape in cross section, pivoted upon a pin 402 carried by and extending parallel to the end of the safety table. The arm portions 403, 404 of the Y-shaped yoke extend outwardly and are so spaced as to embrace the supporting side arm portions 235L, while the stem of the Y-shaped yoke is defined by a luglike portion 405 having a rounded extremity extending inwardly toward the safety table and frictionally engageable between and located by a pair of spaced rounded leaf spring portions 406, 408 which also serve to limit tilting movement of the yoke about the pivot 402. When the safety table is tilted in one direction, it swings the yoke 400 correspondingly. The yoke then leaves the side bar portion 235L as the tilting movement of the safety table is continued, but the yoke is held in its tilted position by engagement of the lug 405 with an outer surface of one of the rounded spring portions 406, 408 so that the yoke is ready to again receive the side bar as the table is returned to the parallel position, and during the final stage of movement of the table to the full parallel position the lug snaps into the space between the springs 406, 408 to yieldably maintain the table in such position. It will be appreciated that the same action occurs each time the table is tilted away from the parallel position in either direction.

In Figs. 39 and 39A, I have shown a somewhat further modification of the means for controlling the angular extent of pivotal movement of the safety table assembly with respect to the supporting side bar structure 235*p*, The framework of the safety table assembly is fragmentarily illustrated at 16p. The extent of angular movement of the table is limited by a stop assembly shown in dotted lines and generally designated 250p. The arrangement of the stop assembly may correspond generally to that shown in Fig. 20, but in this embodiment I have provided, over the angular stop assembly itself, a sheet metal housing structure consisting of a sheet metal bottom wall 480 and a partly cylindrical top wall 482 which is substantially concentric with the crossbar portion 230p. Such sheet metal walls cover the stop structure and the crossbar and side bar portions 230p, 235p adjacent such stop structure. An arcuate slot 484 is formed in the cylindrical wall 482 in which such adjacent part of the side bar 235p may travel. A sliding gate 481 secured to the side bar portion 235p closes the slot at all times and coacts with the wall portions 480 and 482 to prevent clothing or fingers from becoming caught in or between the pivoted parts.

In Figs. 40 and 41 I have shown a further modification incorporating certain features of both of the embodiments of Figs. 8 and 11. The supporting side bar structure designated 235q is pivotally attached to the vehicle floor 205u as by means of a reinforcing plate 490 carrying pivot means 238q to which the side bar portions 235q are attached. The safety table assembly generally designated 12u may be attached to the upper extremity of the side bar portion 235u as in one of the ways previously described. A bracing link structure 242u is also provided extending angularly downwardly and forwardly from a slidable collar 240u carried by the side bar portion 235q, the bracing links 242q being pivotally attached to the collar by suitable pivot means 244q while at its other end the bracing link is pivotally connected by pivot means 245q to a reinforcing plate portion 492 also attached to the vehicle floor. Suitable ratchet or one-way acting clutch means (not shown) is also provided for preventing unwanted sliding movement of the collar 240q along the side bar portion 235q and such holding means is releasable by means of the handle 248q also in the manner previously described, although in this embodiment the side bar portion, as best indicated in Fig. 41, may be provided with serially disposed notches 494 with which the holding means actuatable by the handle 248q may engage to provide positive holding means.

The modification depicted in Figs. 42 and 43 is in some respects similar to the embodiment of Figs. 28–32 in that the safety table structure is easily bodily removable from the vehicle and when installed is tied at the ends to supports which are directly interconnected with a suitable abutment device carried by the end of the transverse bar portion which in the case of this embodiment is designated 230r. The safety table frame structure is designated 16r and, as clearly shown in perspective in Fig. 42, a separate cross bar portion is provided one of which is incorporated at each end of the safety table assembly, although only one is illustrated, and each such supporting bar portion is carried by a heavy slidable supporting portion 500 slidable in suitable bearing supports as 502 and movable by means of a handle portion 504 which is positioned to be readily accessible, as by arranging the same in an exposed position in a pocket formed in the safety table. Such pocket is designated 29r. The end portion of the bar section 230r carries a transverse linklike abutment 352r which projects diametrically from the rod. An elongated supporting bracket generally designated 335r is provided adapted to be secured as by suitable screw means as 505 to a supporting panel as 333r or other appropriate support arranged beside an end of the seat cushion and at a suitable elevation, as will be understood. Formed in the bracket structure is a longitudinally elongated chamber generally designated 506 which is connected to the outside of the bracket which faces the end of the safety table by a slot 508 which is of a width sufficient to admit the keying plate 352r but which is not wide enough to accept the rod portion 230r except at spaced predetermined positions whereat the slot is provided with substantially semicylindrical enlargements 510 so proportioned as to receive the end of the rod 230r. It will be seen that by virtue of this arrangement, when the keying plate portion 352r is turned so as to lie parallel to the slot 508 the rod portion 230r with the keying plate 252r attached thereto may be slid into the slot 508 by projecting the end of the rod 230r into one of the enlargements 510 while the keying plate is slid through the adjacent narrower portions of the slot into the internal vertical enlarged chamber 506, the horizontal width of which is somewhat greater than the horizontal keying plate 352 so that after the parts are fully inserted as described the safety table together with the rod 230r and keying 352 may be turned about the axis of the rod 230r to rotate the keying plate to a position in which it is no longer parallel to the slot 508. In such position the keying plate, projecting behind adjacent wall portions on either side of the slide 508 prevents the keying plate and rod from being pulled out of the bracket structure and thus rigidly ties the adjacent end of the safety table through the brackets. In positions symmetrically disposed with respect to each of the enlargements 510 the internal elongated chamber 506 is provided with abutment walls arranged to limit the degree of angular movement of the keying plate 352r and thereby to limit the tilting movement of the safety table assembly since the safety table is keyed with respect to the rod structure 230r and, accordingly, can move only to the extent permitted by the keying plate 352r. Such abutment walls formed in the elongated chamber 506 are best shown in Fig. 43. As there indicated, when the keying plate 352r is rotated to one extreme position, shown in dotted lines, the keying plate brings up against a pair of flat walls 511, 512, while when rotated to the other extreme, indicated in dot-dash lines, the plate brings up against a pair of suitably positioned flat walls 514, 515. To prevent the keying plate from turning with respect to the safety table assembly, the portion of the rod structure 230r which is slidably mounted in the safety table frame structure, which portion is designated 500 as previously indicated, may be of rectangular cross section and slidable in slide bearing orifices of similar cross section. It will be understood that when the plate is turned to parallelism with the slot 508 the keying plates at opposite ends of the assembly may simply be pulled free to release the safety table structure although, if preferred, similar operation could be attained with the use of only one slidable support, the keying plate and supporting rod on the other end being fixed to the safety table, as will be understood. It will also be appreciated that such a bodily removable safety table structure may be made foldable for convenience of stowage and transportation as previously indicated.

A further modification shown in Figs. 44–46 incorporates a substantially rectangular cross rod 230s slidable in suitable supporting bearing portions as 502s carried by the internal frame structure 16s of the safety table and is slidable therein by appropriate handle means as 504s so that the extent to which it projects from the end of the safety table assembly 12s may be adjusted. When fully projected, the outer end of the rectangular rod structure 230s is adapted to project into any one of a plurality of sockets 510s formed in the bracket structure 335s, the general arrangement and mounting of which may correspond to those of the bracket 335r of the embodiment last described. In the present embodiment, the socketed portion of the bracket 335s is relatively thick in a direction transverse of the vehicle so that the sockets 510s are of substantial depth. Inasmuch as the sockets fit the projecting portion of the rod 230s relatively snugly and the rod is formed of heavy material of great strength, the tendency of the bracket to hold the rod against bending has the effect of causing the rod to resist forward movement of the supported safety table assembly in a manner which is primarily in shear. A structure of great strength is thus afforded without the necessity of employing a keying device such as the keying plate 352 employed in the last-described embodiment. In order to remove the safety table it is merely necessary to pull the rod 230s out by means of the handle 504s, without any need for turning the safety table to a particular position to enable such removal.

The extent to which the safety table can rock with respect to the supporting rod 237 is in this embodiment limited by novel stop means shown in Figs. 45 and 46. It will be appreciated that this stop means might be employed with other previously described embodiments. The supporting rod 230s is fixedly secured within the interior of one of the frame channels as 49s to a block 250s having abutment walls as 520, 522 adapted to coact with appropriately positioned abutment plates 252s, 253s rigidly secured in the channel 49s as by being welded therein as indicated at 526. As clearly shown in Fig. 46, intermediate portions of the abutment plates and of the block member 250s are substantially cylindrical and concentric with respect to the axis of the bar 230f so that the parts may rotate until the abutment walls strike one another as previously indicated, to define the extent of permitted tilting movement of the safety table.

In Fig. 47 I have shown a releasable clamping block 338t corresponding to the clamping block 338 of the embodiment of Figs. 28–32 in general construction and having an opening 348t therein adapted to receive the end of the supporting bar 230t which corresponds to the bar portion 230s of the last-described embodiment, such end of the bar portion 230t being releasably held in position by a handle structure 340t whereby the bar may be releasably secured to a supporting bracket structure which, although not shown in Fig. 47, corresponds to the bracket structure of Fig. 28. The slot 348t is generally L-shaped, corresponding generally to the slot 348 shown in Figs. 28 and 29, but no internal chamber or keying device corresponding to the chamber 350 or the keying device 352 need be employed in this embodiment, the bar being simply held in the lower forward end of the slot 348t by an integral ear 530 formed on the handle 340t and projectable downwardly into blocking position to hold the bar in the forward end of the slot when the handle is in closed position as shown in Fig. 47. When the handle is swung upwardly and rearwardly in the direction indicated by the arrow 532, the bar is released and may readily be removed from the slot by tilting the safety table and moving the bar out of the L-shaped slot as will be apparent. It will also be appreciated that in this embodiment the supporting bar portion 230t need not be slidable in the safety table.

In Fig. 49 I have shown a somewhat modified safety table structure formed of an integrally folded length of sheet metal having central portions 535, 536 lying close together and which may be welded to one another as indicated at 538, the portions of the looped sheet metal along the edges of the safety table being looped to generally rounded form as indicated at 540. A central longitudinal portion of the sheet metal table structure which central portion is designated by 542 is set to form a generally rectangular orifice in which a rectangular cross rod portion 230u is carried and from which it projects such rod portion being rigidly fastened to the similarly cross sectioned enclosing sheet metal portion. The sheet metal is preferably relatively malleable or soft so that it will bend rather than break but is sufficiently rigid to provide great resistance to distortion and effectively hold the occupant against being thrown forwardly as in the previous embodiment. It will be understood that the sheet metal frame structure may be covered by padding also if desired, to distribute the pressure more evenly over the body of the passenger in event of severe impact, although the metal table itself constructed as shown will afford effective protection and such details are of course subject to variation.

It will be recognized that electric, hydraulic, vacuum or other operating means could readily be incorporated in the various preferred embodiments disclosed, and that while such preferred embodiments are well calculated to fulfill the objects above stated, it will be appreciated that the invention is susceptible to further modification, variation and change without departing from the proper scope or fair meaning of the subjoined claims.

I claim:

1. In a safety device for protecting an occupant of a vehicle seat, a protective element having a relatively narrow surface portion and a relatively wider surface portion, means including a supporting structure in proximity to the seat for positioning said element with said wider surface portion substantially horizontal and extending in proximity to the seat and transversely to and higher than the seat, and means tiltably connecting said element to the supporting structure for tilting movement about an axis transverse with respect to the seat whereby said wider surface portion may be turned from said horizontal position to a position wherein it presents said wider surface portion toward an occupant of the seat.

2. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat.

3. A combination as defined in claim 1 wherein said protective element is relatively flat and said supporting structure includes pivot means arranged upon such transverse axis.

4. A combination as defined in claim 1 wherein said protective element is relatively flat and said supporting structure includes pivot means arranged upon such transverse axis, and stop means limiting tilting movement of said protective element about said axis.

5. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of arms, means for movably connecting the arms to the vehicle, and releasable holding means operatively connectable with the arms to prevent unwanted movement of such arms.

6. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of slidable arms, slide bearing means for movably connecting the arms to the vehicle, and releasable holding means operatively connectable with the arms to prevent unwanted movement of such arms.

7. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of slidable arms, slide bearing means for movably connecting the arms to the vehicle, and releasable one way acting holding means operatively connectable with the arms to prevent unwanted movement of such arms in one direction.

8. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of arms, means for movably connecting the arms to the vehicle, and releasable one way acting holding means operatively connectable with the arms to prevent unwanted movement of such arms in one direction.

9. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of arms, means for movably connecting the arms to the vehicle, and releasable pawl means operatively connectable with the arms to prevent unwanted movement of such arms.

10. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of arms, means for pivotally and slidably connecting the arms to the vehicle, and releasable holding means operatively connectable with the arms to prevent unwanted pivotal and sliding movement of such arms.

11. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of arms, means for movably connecting the arms to the vehicle, and releasable holding means operatively connectable with the arms to prevent unwanted movement of such arms, said arms being spaced laterally of the vehicle, and pivot portions connected to said arms and extending into the interior of the protective element to define the axis of tilting movement.

12. In combination with means as set forth in claim 1, means for releasably rigidly positioning said supporting structure in such a position of proximity to a seat in a vehicle whereby upon release of such positioning means the supporting structure and protective element may be simultaneously moved as a unit away from proximity to the seat, said positioning means including a plurality of arms, means for pivotally connecting the arms to the vehicle, and releasable holding means operatively connectable with the arms to prevent unwanted pivotal movement of such arms.

13. Means as set forth in claim 1 wherein said supporting structure includes a plurality of spaced pivotal supporting portions, and positioning means for rigidly but releasably positioning each of said supporting portions.

14. In a vehicle structure having a floor and a plurality of seats spaced one behind another upon said floor, a safety device for protecting occupants of a rear seat comprising a protective element, means for releasably positioning said element in proximity to the seat and transversely to and higher than the seat, and forward of the rear edge of the seat, including a plurality of laterally spaced supports attached to the floor, arms connected to said supports and slidable forwardly and downwardly and upwardly and rearwardly with relation to the supports, said element being carried by said arms, and releasable means for preventing forward and downward movement of said arms.

15. In a vehicle construction incorporating a plurality of seats spaced one behind another and incorporating a body frame structure surrounding said seats, a safety device for protecting occupants of a rear seat comprising a protective element, means for releasably positioning said element in proximity to the seat and transversely to and higher than the seat, and forward of the rear edge of the seat, including a plurality of laterally spaced supports attached to said body frame structure, arms movably connected to said supports and carrying said element, and releasable means for preventing unwanted movement of said arms.

16. In a vehicle construction incorporating a plurality of seats spaced one behind another and incorporating a body frame structure surrounding said seats, a safety device for protecting occupants of a rear seat comprising a protective element, means for releasably positioning said element in proximity to the seat and transversely to and higher than the seat, and forward of the rear edge of the seat, including a plurality of laterally spaced supports attached to the body frame structure on opposite sides of a front seat, arms movably connected to said supports and extending rearwardly to proximity with respect to a rear seat and carrying said element, and releasable means for preventing unwanted movement of said arms.

17. In a vehicle structure having a floor and a seat, a safety device for protecting an occupant of the seat comprising a protective element, means for releasably positioning said element in proximity to the seat and transversely to and higher than the seat, and forward of the rear edge of the seat, including a plurality of laterally spaced supports attached to the floor in front of the seat, arms connected to said supports and slidable forwardly and downwardly and upwardly and rearwardly with relation to the supports, said element being carried by said arms, and releasable means for preventing forward and downward movement of said arms.

18. A safety device for protecting the occupant of a vehicle seat against being thrown forwardly comprising an elongated support and means for mounting the support in a vehicle for movement in a direction generally longitudinal with respect to the vehicle, a restraining element carried by said support and movable therewith toward and from such a seat adjacent which the same is installed, and releasable means for holding said support and restraining element against unwanted forward movement, said restraining element being secured to said support for pivotal movement about a common axis transverse to said support.

19. An assembly as defined in claim 18 including a pair of such supports laterally spaced from one another, said restraining element being secured to both of said supports for pivotal movement about a common axis transverse to said supports, one face of said element being formed of cushioning material, and an opposite face thereof being generally planar, said element being swingable about said pivot means from a position wherein said generally planar surface lies uppermost and substantially horizontal to a generally vertical position.

20. A safety device for installation in motor vehicles and the like comprising a plurality of longitudinally slidable supporting bars, means for supporting said bars and for controlling the sliding movement thereof including slide bearings and releasable holding means for preventing sliding movement of such bars in at least one direction and a bracing element adapted to obstruct unwanted forward movement of a passenger, such bracing element being carried by said bars, and coaxial pivot means pivotally connecting said element to said bars.

21. A safety device for blocking unwanted forward movement of a passenger of a vehicle in event of accident including a supporting bar adapted to be mounted for sliding movement in a direction generally longitudinal with respect to the vehicle, a bracing element carried by said bar appurtenant to one end thereof and movable with the bar during such sliding movement, means for preventing unwanted sliding movement of the bar, and means for supporting the bar for sliding movement and to permit vertical adjustive movement of said element, including a slide-bearing portion with which said bar is slidably interengaged and which engages a portion of the bar remote from said element, means for pivotally connecting said slide bearing portion to a vehicle structure to permit swinging movement of said bar and element in a substantially vertical plane, and releasable holding means for preventing undesired swinging movement thereof.

22. A safety device as claimed in claim 20 wherein said element is of generally planar form and comprises a tray-like portion upon one side, a padded portion of resilient character on the other side of said element, and means pivotally connecting said element to said bar for swinging movement about a substantially horizontal axis transverse with respect to the bar.

23. In a safety device for protecting an occupant of a vehicle seat, a protective element comprising a rigid cross member having a relatively narrow surface portion and a relatively wider surface portion, means including a rigid supporting structure in proximity to the seat for holding said element against substantial forward movement with said wider surface portion substantially horizontal and extending in proximity to the seat and transversely to and higher than the seat, and means tiltably connecting said element at its ends to the supporting structure for tilting movement about an axis transverse with respect to the seat whereby said wider surface portion may be turned from said horizontal position to a position wherein it presents said wider surface portion toward an occupant of the seat.

24. A combination as defined in claim 23 wherein said protective element is relatively flat and said supporting structure includes pivot means arranged upon such transverse axis.

25. In a safety device for protecting an occupant of a vehicle seat, a protective element comprising a rigid cross member having a relatively narrow surface portion and a relatively wider surface portion, means including a rigid supporting structure extending forwardly and rearwardly with respect to the seat and the vehicle and having a portion in proximity to the seat for holding said element against substantial forward movement with said wider surface portion substantially horizontal and extending transversely to and higher than the seat, and means tiltably connecting said element at its ends to the supporting structure for tilting movement about an axis transverse with respect to the seat whereby said wider surface portion may be turned from said horizontal position to a position wherein it presents said wider surface portion toward an occupant of the seat.

26. In a safety device for protecting an occupant of a vehicle seat, a protective element comprising a rigid cross member having a relatively narrow surface portion and a relatively wider surface portion, means including a rigid supporting structure extending forwardly and rearwardly with respect to the seat and the vehicle and having a portion in proximity to the seat for holding said element against substantial forward movement with said wider surface portion substantially horizontal and extending transversely to and higher than the seat, means tiltably connecting said element at its ends to the supporting structure for tilting movement about an axis transverse with respect to the seat whereby said wider surface portion may be turned from said horizontal position to a position wherein it presents said wider surface portion toward an occupant of the seat, and means for movably connecting said supporting structure to a vehicle.

27. In a safety device for protecting an occupant of a vehicle seat, a protective element comprising a rigid cross member having a relatively narrow surface portion and a relatively wider surface portion, means including a rigid supporting structure extending forwardly and rearwardly with respect to the seat and the vehicle and having a portion in proximity to the seat for holding said element against substantial forward movement with said wider surface portion substantially horizontal and extending transversely to and higher than the seat, means tiltably connecting said element at its ends to the supporting structure for tilting movement about an axis transverse with respect to the seat whereby said wider surface portion may be turned from said horizontal position to a position wherein it presents said wider surface portion toward an occupant of the seat, means for movably connecting said supporting structure to a vehicle, and displaceable means for holding said supporting structure in a predetermined position with respect to the vehicle.

References Cited in the file of this patent

UNITED STATES PATENTS

| | | |
|---|---|---|
| 1,548,870 | Crafton | Aug. 11, 1925 |
| 1,619,697 | Brown | Mar. 1, 1927 |
| 2,322,755 | Voorhies | June 29, 1943 |
| 2,337,480 | Logan | Dec. 21, 1943 |
| 2,499,993 | Gregg | Mar. 7, 1950 |
| 2,586,063 | Kurtz | Feb. 19, 1952 |
| 2,654,616 | Mockli | Oct. 6, 1953 |